US011870057B2

United States Patent
Zhang et al.

(10) Patent No.: US 11,870,057 B2
(45) Date of Patent: Jan. 9, 2024

(54) DRY PROCESS FORMATION OF SOLID STATE LITHIUM ION CELL

(71) Applicant: Navitas Systems, LLC, Woodridge, IL (US)

(72) Inventors: Pu Zhang, Ann Arbor, MI (US); Michael Wixom, Ann Arbor, MI (US); Robert Sosik, Ann Arbor, MI (US)

(73) Assignee: Navitas Systems, LLC, Ann Arbor, MI (US)

( * ) Notice: Subject to any disclaimer, the term of this patent is extended or adjusted under 35 U.S.C. 154(b) by 260 days.

(21) Appl. No.: 16/268,811

(22) Filed: Feb. 6, 2019

(65) Prior Publication Data

US 2020/0028156 A1 Jan. 23, 2020

Related U.S. Application Data

(60) Provisional application No. 62/626,923, filed on Feb. 6, 2018.

(51) Int. Cl.
*H01M 4/1395* (2010.01)
*H01M 10/0562* (2010.01)
(Continued)

(52) U.S. Cl.
CPC ......... *H01M 4/1395* (2013.01); *H01M 4/043* (2013.01); *H01M 4/134* (2013.01);
(Continued)

(58) Field of Classification Search
CPC ...... H01M 4/043; H01M 4/134; H01M 4/366; H01M 4/382; H01M 4/505; H01M 4/525; H01M 4/622; H01M 4/623; H01M 4/628
See application file for complete search history.

(56) References Cited

U.S. PATENT DOCUMENTS 4,977,007 A * 12/1990 Kondo ............. H01M 4/02 428/76
2009/0117461 A1* 5/2009 Shembel ............. H01M 4/0411 429/231.95

(Continued)

FOREIGN PATENT DOCUMENTS

CN 106299470 * 1/2017

OTHER PUBLICATIONS

English translation of CN Publication 106299470, Jan. 2017.*

*Primary Examiner* — Brittany L Raymond
(74) *Attorney, Agent, or Firm* — Dinsmore & Shohl LLP; Weston R. Gould

(57) ABSTRACT

Methods for preparing an electrode may include compressing an electrode dry mixture comprising an active material and an electrolyte material to form an electrode film. An electrolyte dry mixture or a stand-alone solid-state electrolyte film is compressed against a surface of the electrode film to form a laminate of an electrolyte layer and the electrode film. The electrolyte dry mixture may include the electrolyte material. Compressing the electrode dry mixture may include calendering the electrode dry mixture. Compressing the electrolyte dry mixture or stand-alone electrolyte film may be accomplished also by calendering. The electrolyte material may include a glass ceramic and, optionally, an air-stabilizing dopant. The glass ceramic may include $Li_3PS_4$. Thus, the electrodes may include a composite cathode and a solid-state electrolyte layer. The methods may be applicable for a solvent-free process to form electrodes and electrochemical cells and batteries including the electrodes.

15 Claims, 17 Drawing Sheets

(51) Int. Cl.
    *H01M 4/36*     (2006.01)
    *H01M 4/38*     (2006.01)
    *H01M 4/62*     (2006.01)
    *H01M 10/052*     (2010.01)
    *H01M 4/04*     (2006.01)
    *H01M 4/134*     (2010.01)

(52) U.S. Cl.
    CPC ........... *H01M 4/366* (2013.01); *H01M 4/382* (2013.01); *H01M 4/628* (2013.01); *H01M 10/052* (2013.01); *H01M 10/0562* (2013.01); *H01M 2300/0068* (2013.01)

(56) References Cited

U.S. PATENT DOCUMENTS

| | | | |
|---|---|---|---|
| 2010/0273062 A1* | 10/2010 | Tsuchida | H01M 4/366 |
| | | | 429/304 |
| 2014/0264158 A1* | 9/2014 | Reichman | H01M 4/525 |
| | | | 252/182.1 |
| 2014/0370398 A1* | 12/2014 | Lee | H01M 4/5815 |
| | | | 429/322 |
| 2015/0303481 A1* | 10/2015 | Duong | H01G 9/15 |
| | | | 241/5 |
| 2016/0028108 A1* | 1/2016 | Hashimoto | H01M 4/623 |
| | | | 156/60 |
| 2016/0211547 A1* | 7/2016 | Hwang | H01M 4/134 |
| 2017/0098826 A1* | 4/2017 | Mitchell | H01M 4/131 |
| 2019/0131613 A1* | 5/2019 | Mitchell | H01M 4/0402 |

* cited by examiner

DRY PROCESS FORMATION OF SOLID STATE LITHIUM ION CELL

CROSS-REFERENCE TO RELATED APPLICATION

This application claims the benefit of priority under 35 U.S.C. § 119(e) to U.S. Provisional Application Ser. No. 62/626,923, filed Feb. 6, 2018, incorporated herein by reference in its entirety.

STATEMENT OF GOVERNMENT RIGHTS

This disclosure was created with Government support under Contract No. W911QX-17-P-0175 awarded by the United States Army. The Government has certain rights in this invention.

FIELD

This disclosure relates to batteries and to methods for forming batteries and components thereof. More specifically, the disclosure relates to electrodes, separators, and electrolytes suitable for use in solid state lithium ion or sodium ion batteries, and to methods for forming batteries including the same.

BACKGROUND

Rechargeable lithium-ion batteries are used increasingly in essential applications such as powering electric/hybrid vehicles, cellular telephones, and cameras. Recharging these battery systems is achieved using electrical energy to reverse the chemical reaction between and at the electrodes used to power the device during battery discharge thereby priming the battery to be capable of delivering additional electrical power.

Solid electrolyte systems are believed to provide significant safety advantages due to the reduction of the possibility of thermal runaway that is more likely to occur in the presence of liquid electrolytes used in conventional lithium ion batteries. The primary challenges facing solid state electrolytes in practice, however, are low conductivity, limited stability and poor mechanical properties. New solid state electrolytes (SSE) are emerging with suitable intrinsic conductivity for lithium ion battery architecture but still face key technical challenges by stability and the availability of scalable processes to produce them with the necessary combination of thickness, uniformity, interfacial impedance and mechanical strength.

Whether as glass or in ceramic form, solid state ionic conductors for use in solid state batteries generally require high temperature sintering or vapor deposition to consolidate the films and manage interfacial impedance. The resulting films are brittle, and available consolidation processes have limited production to low capacity devices or small disks.

Accordingly, ongoing needs exist for materials and methods that improve properties of electrochemical cells including solid state electrolytes and that increase processibility within fabrication steps for the electrochemical cells.

SUMMARY

Some embodiments of this disclosure are directed to methods for preparing an electrode. The methods include compressing an electrode dry mixture to form an electrode film of an electrode material, the electrode dry mixture comprising an active material and an electrolyte material. In some embodiments, the methods may further include compressing an electrolyte dry mixture against a surface of the electrode film to form an electrolyte layer on the surface of the electrode film, the electrolyte dry mixture comprising the electrolyte material. In other embodiments, the methods may further include compressing an electrolyte dry mixture to form a stand-alone solid-state electrolyte film, the electrolyte dry mixture comprising the electrolyte material, then compressing the stand-alone solid-state electrolyte film against a surface of the electrode film to form a laminate of the electrode film and the solid-state electrolyte film. In some embodiments, compressing the electrode dry mixture may include calendering the electrode dry mixture; and compressing the electrolyte dry mixture may include applying the electrolyte dry mixture to the surface of the electrode film and then calendering the electrolyte dry mixture against the surface of the electrode film. In some embodiments, the electrolyte material may include a glass ceramic and, optionally, an air-stabilizing dopant.

Further embodiments are directed to electrodes prepared by the methods described in this disclosure.

Still further embodiments are directed to stand-alone solid-state electrolyte films prepared by compressing or calendering an electrolyte dry mixture comprising an electrolyte mixture such as $Li_3PS_4$ glass ceramic and an optional binder, for example.

Still further embodiments are directed to electrochemical cells or batteries including at least one electrode prepared by the methods described in this disclosure.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
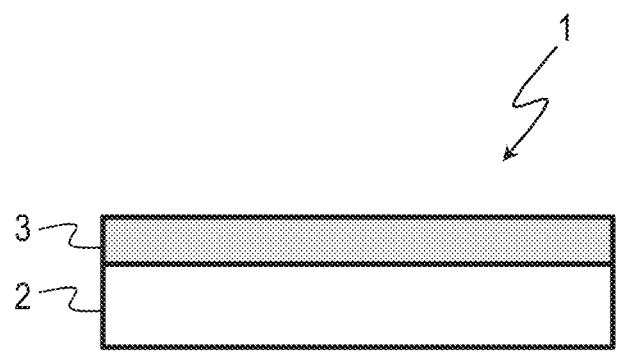
FIG. 1 is a cross-section of an example solid-state electrode prepared by methods according to embodiments of this disclosure.

The following description of particular aspect(s) is merely exemplary in nature and is in no way intended to limit the scope of the disclosure, its application, or uses, which may, of course, vary. The materials and processes are described with relation to the non-limiting definitions and terminology included herein. These definitions and terminology are not designed to function as a limitation on the scope or practice of the disclosure, but are presented for illustrative and descriptive purposes only. While the processes or compositions are described as an order of individual steps or using specific materials, it is appreciated that steps or materials may be interchangeable such that the description of the disclosure may include multiple parts or steps arranged in many ways as is readily appreciated by one of skill in the art.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first 'element'", "component," "region," "layer," or "section" discussed below could be termed a second (or other) element, component, region, layer, or section without departing from the teachings herein.

The terminology used herein is for the purpose of describing particular aspects of the disclosure only and is not intended to be limiting. As used herein, the singular forms "a," "an," and "the" are intended to include the plural forms, including "at least one," unless the context clearly indicates otherwise. Unless indicated otherwise, the term "or" is equivalent to "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It should be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "absorbing" can mean: intercalation or insertion or conversion alloying reactions of lithium with the active materials.

As used herein, "desorbing" can mean: de-intercalation or de-insertion or conversion de-alloying reactions of lithium with the active materials.

As used herein, in the context of the Li-ion cell, "cathode" means positive electrode and "anode" means the negative electrode.

As used herein an "active material" is a material that participates in electrochemical charge/discharge reaction of an electrochemical cell such as by absorbing or desorbing lithium.

As used herein, "fibrillizable" can mean capable of processing into the formation of fibrils.

As used herein, "intermixing" can mean forming a mixture by mixing a mass of ingredients. Intermixing can mean high-shear mixing to effect fibrillization.

As used herein, "mechanical strength" can mean the ability of a material to withstand an applied load without failure or deformation.

As used herein, "surface roughness" can mean the roughness or a surface texture defined by deviations in the normal vector of a real surface from its ideal form. Surface roughness may include complex shapes made of a series of peaks and troughs/pores of varying heights, depths, and spacing.

Embodiments of this disclosure include electrodes including a solid state electrolyte (SSE). Further embodiments of this disclosure include electrochemical cells, for example solid state batteries (SSB), that include an electrode having a SSE. In some embodiments, the electrode having the SSE may be prepared by solvent-free electrode fabrication.

Limited conductivity dictates that solid electrolytes be incorporated into cells as thin films. Production routes starting from vapor deposition, such as used previously, are not economical. Prior production routes starting from powders generally entail sintering or other consolidation processes that are limited by poor mechanical strength, thermal expansion mismatch, non-flexibility, or uniformity limitations. Improvement is also needed in raw material costs and compatibility with unit operations suitable for high-volume production.

Example configurations for solid-state electrodes, electrochemical cells including the solid-state electrodes, and solid-state batteries will now be described. Methods for preparing the electrodes will be described subsequently.

Referring to FIG. 1, a solid-state electrode 1 includes a cathode 2 and a solid-state electrolyte 3. These components will be described subsequently in greater detail.

Figure 2:
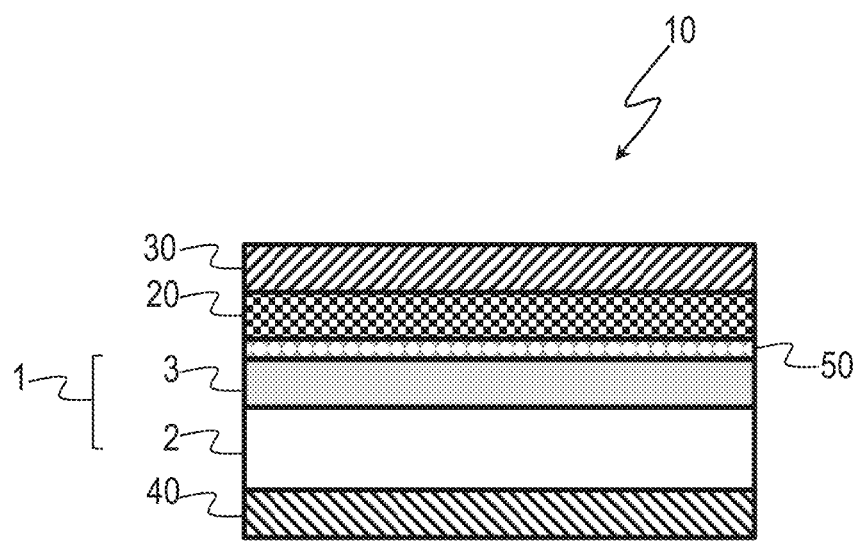
FIG. 2 is a cross-section of an example electrochemical cell including a solid-state electrode prepared by methods according to embodiments of this disclosure.

Referring to FIG. 2, an electrochemical cell 10 includes a solid-state electrode 1, an anode 20, optionally an anode current collector 30, optionally a cathode current collector 40, and optionally an anode protective layer 50. The solid-state electrode 1 includes a cathode 2 and a solid-state electrolyte 3. These components will be described subsequently in greater detail.

Figure 3:
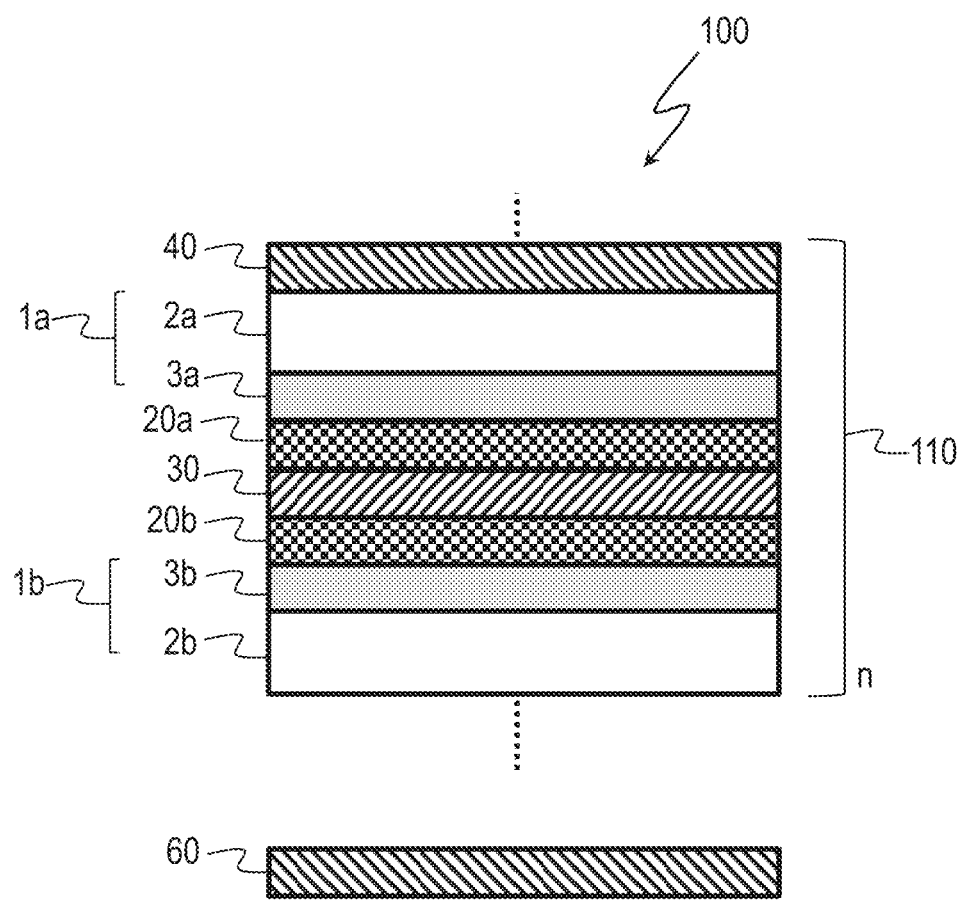
FIG. 3 is a cross-section of an example battery stack including a solid-state electrode prepared by methods according to embodiments of this disclosure.

Referring to FIG. 3, a solid-state battery 100 in one example configuration includes a multicell battery stack 110 of n electrochemical cells and an end cathode current collector 60, where n may be equal to 1, from 1 to 2, from 1 to 10, from 1 to 50, from 1 to 100, from 1 to 1000, from 1 to 10,000, or from 1 to greater than 10,000. Each repeating unit of the multicell battery stack 110 may include a first solid-state electrode 1a having a first cathode 2a and a first solid-state electrolyte 3a. The first solid-state electrode 1a is oriented such that: the first cathode 2a is between the first solid-state electrolyte 3a and a cathode current collector 40, and the first solid-state electrolyte 3a is between the first cathode 2a and a first anode 20a. Each repeating unit of the multicell battery stack 110 may further include a second solid-state electrode 1b having a second cathode 2b and a second solid-state electrolyte 3b. The second solid-state electrode 1b is oriented such that: the second cathode 2b is between the second solid-state electrolyte 3b and a cathode current collector of an adjoining cell (not shown) or the end cathode current collector 60, and the second solid-state electrolyte 3b is between the second cathode 2b and a second anode 20b. Each repeating unit of the multicell battery stack 110 may include an anode current collector 30 between the first anode 20a and the second anode 20b. These components will be described subsequently in greater detail.

Figure 4:
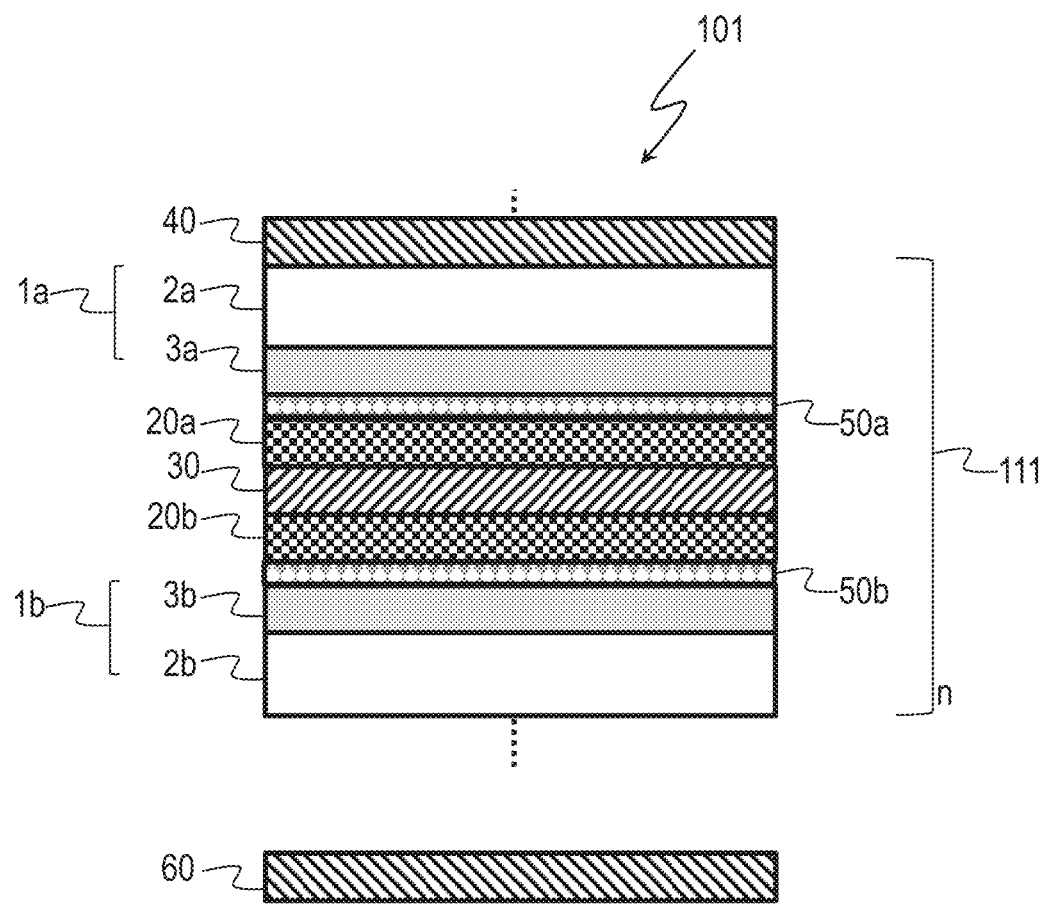
FIG. 4 is a cross-section of an example protected-anode battery stack including a solid-state electrode prepared by methods according to embodiments of this disclosure.

Referring to FIG. 4, an protected-anode solid-state battery 101 in one example configuration includes a protected-anode multicell battery stack 111 of n electrochemical cells and an end cathode current collector 60, where n may be equal to 1, from 1 to 2, from 1 to 10, from 1 to 50, from 1 to 100, from 1 to 1000, from 1 to 10,000, or from 1 to greater than 10,000. The protected-anode multicell battery stack 111 include the components 1a, 2a, 3a, 1b, 2b, 3b, 20a, 20b, 30, 40, 60 of the solid-state battery 100 as previously described with reference to FIG. 3. In addition, the protected-anode multicell battery stack 111 further includes: a first anode protective layer 50a between the first anode 20a and the first solid-state electrolyte 3a, and a second anode protective layer 50b between the second anode 20b and the second solid-state electrolyte 3b. These components will be described subsequently in greater detail.

In embodiments, the solid-state electrolyte 3 includes polymer/ceramic composite solid electrolyte material, such as a $Li_2S-P_2S_5$ (LPS) solid conductor, for example, which is selected as the base solid electrolyte. The LPS material has several advantages over LiPON or garnet oxide materials, including without limitation, intrinsic high ionic conductivity (up to $10^{-2}$ S/cm at 25° C.), potentially low process cost, and good mechanical properties for flexible film forming.

Nonlimiting, example embodiments of methods for preparing an electrode now will be described. The methods for preparing an electrode may include first compressing an electrode dry mixture to form an electrode film of an electrode material. The electrode dry mixture may include an active material, an electrolyte material, and one or more optional additives such as a binder well suited to forming films of the electrode material. The methods further include compressing an electrolyte dry mixture against a surface of the electrode film to form an electrolyte layer on the surface of the electrode film. The electrolyte dry mixture includes electrolyte material and one or more optional additives such as a binder well suited to forming films of the electrolyte material. Compressing the electrode dry mixture may include calendering the electrode dry mixture. Compressing the electrolyte dry mixture may include first applying the electrolyte dry mixture to the surface of the electrode film and then calendering the electrolyte dry mixture against the surface of the electrode film.

Figure 5A:
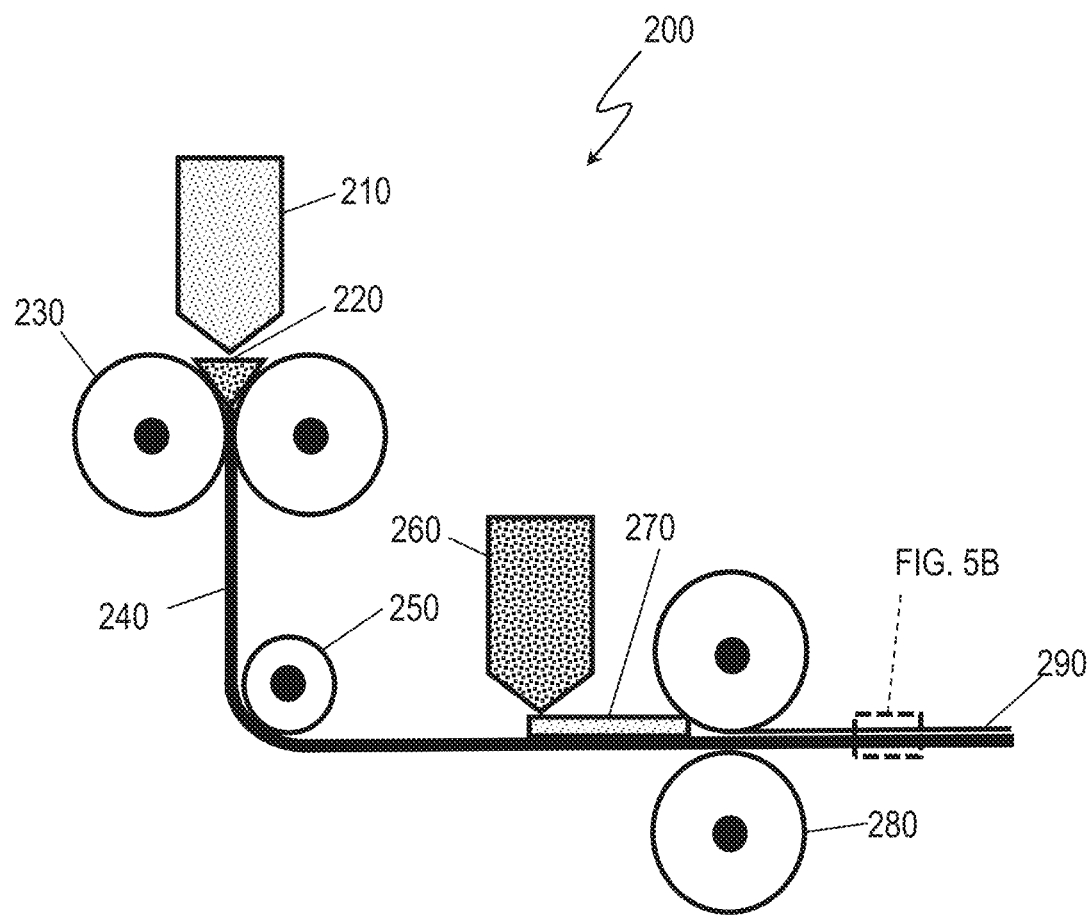
FIGS. 5A and 5B are a schematic of an example method for forming a solid-state electrode according to embodiments of this disclosure.
Figure 5B:
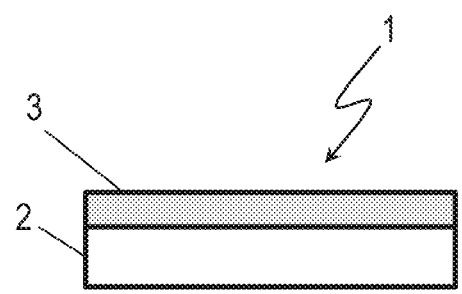

Referring to FIGS. 5A and 5B, from a first dispenser 210, and electrode dry mixture 220 may be compressed between first calender rolls 230 to form an electrode film 240 of the electrode material. Optionally, the electrode film 240 may be conveyed over one or more additional rollers such as side roller 250, depending on the desired manufacturing configuration. From a second dispenser 260, dry electrolyte mixture 270 then may be applied in powder form directly onto a surface of the electrode film 240 as it moves toward second calender rolls 280. The electrode film 240 serves as a support layer, circumventing the need to handle very thin free-standing solid-state electrolyte layer. The dry electrolyte mixture 270 is then compressed against the surface of the electrode film 240 with force sufficient to provide a solid-state electrode film 290, shown in cross-section in FIG. 5B as a solid-state electrode 1 including a cathode 2 and a solid-state electrolyte 3. The solid-state electrolyte feeding speed, calendering speed, gap, pressure, and temperature may be optimized through a Robust Engineering protocol. Since all the components in the bilayer film is stable up to 320° C., the electrode film 240 can be heat treated at temperature at 280° C. to improve its conductivity and strength if necessary.

Thus, when incorporated into a solid-state battery, a cathode 2 is optionally fabricated using a solvent-free roll mill operation to produce a free-standing cathode film (such as electrode film 240, for example). This operation is followed by a second step to apply and laminate a solid-state electrolyte layer on the cathode. This process produces a multi-layer stack suitable for high-volume production of conventional lithium battery architecture and cell formats.

The solid-state electrolyte 3 provided herein may be or may include a polymer/ceramic composite solid electrolyte material based on a structurally modified lithium sulfide. Such a solid-state electrolyte delivers both high Li-ion conductivity and good chemical stability. A solid-state electrolyte 3 may be formed of a polymer/ceramic composite solid electrolyte material. A solid-state electrolyte 3 may be formed of an electrolyte material that is a dry material, a solid material, a ceramic material, or a glass-ceramic material. A solid-state electrolyte 3 may include a lithium sulfide, a lithium phosphorus sulfide such as $xLi_2S-yP_2S_5$, or $Li_3PS_4$ (LPS; $xLi_2S-yP_2S_5$, where x=75 and y=25). In some aspects a solid-state electrolyte 3 may include a $Li_2S-P_2S_5$. The solid-state electrolyte 3 according to embodiments may be made by ball milling precursor material(s). Precursor materials are optionally lithium sulfide ($Li_2S$, 99.98%, Sigma-Aldrich) and phosphorus pentasulfide ($P_2S_5$, Sigma-Aldrich). $Li_2S$ is optionally provided at 50 mol. % to 90 mol. %, or any value or range therebetween. Optionally, $Li_2S$ is provided at 60 mol. % to 80 mol. %, optionally 75 mol. %. $P_2S_5$ is optionally provided at 10 mol. % to 40 mol. %, or any value or range therebetween. $P_2S_5$ is optionally present at 20 mol. % to 30 mol. %, optionally 25 mol. %.

The precursor materials may be intermixed by ball milling using techniques recognized in the art. For example, the precursor materials may be milled in a zirconia ($ZrO_2$) jar using a planetary ball mill to form a highly conductive glass electrolyte material such as $75Li_2S$—$25P_2S_5$, for example. The glass electrolyte material may be annealed in inert atmosphere such as argon, for example, to increase lithium ion ($Li^+$) or ionic conductivity of the glass electrolyte material.

The resulting electrolyte material may be made into solid-state electrolyte 3 by combination with one or more binders, optionally ion conductive polymer binder, optionally fibrillizable binders. An ion conductive binder is optionally PEO. A binder material used in the formation of a solid-state electrolyte optionally includes a fibrillizable fluoropolymer, optionally, polytetrafluoroethylene (PTFE). Other possible fibrillizable binders include ultra-high molecular weight polypropylene, polyethylene, co-polymers, polymer blends and the like. Optionally, a binder material is a combination of any of the foregoing. A binder is optionally combined with the LPS active solid-state electrolyte material at a weight ratio of 75:25 to 25:75. Optionally, a binder is present at less than 25 wt. %, optionally less than 20 wt. %, optionally less than 15 wt. %, optionally less than 10 wt. %, optionally from 1 wt. % to 15 wt. %. The LPS and binder powder materials are optionally dry blended and pressed through a calender machine to a final thickness.

The solid-state electrolyte 3 has a thickness. A thickness is defined as the length from one surface to the other from a first side intended to contact a cathode to a second side substantially opposite the first side. A thickness is optionally at or less than 100 micrometers (μm). Optionally, a thickness is at or less than 80 μm, optionally at or less than 70 μm, optionally at or less than 60 μm, optionally at or less than 50 μm, optionally at or less than 40 μm, optionally at or less than 30 μm, optionally at or less than 20 μm, optionally at or less than 10 μm. A thickness is optionally 10 μm to 100 μm or any value or range therebetween.

A solid-state electrolyte 3 as provided herein has intrinsic high ionic conductivity. Ionic conductivity is optionally up to about $5 \times 10^{-2}$ S/cm when measured at 25° C., optionally about $1 \times 10^{-4}$ S/cm to about $5 \times 10^{-2}$ S/cm, optionally about $1 \times 10^{-2}$ S/cm.

In some embodiments, a solid-state electrolyte 3 is optionally formed into a stand-alone film and then pressed into contact with an electrode active material or a cathode 2, for example a free-standing cathode film as previously described, or is formed into a film layer directly on the electrode active surface, the cathode 2, or free-standing cathode film, thereby forming a film substantially in situ. Either method may be employed to produce excellent contact between the solid-state electrolyte 3 and the abutting electrode. Thus, methods for forming an electrode or a solid-state electrode may include compressing an electrolyte dry mixture, as previously described, to form a stand-alone solid-state electrolyte film, the electrolyte dry mixture comprising the electrolyte material, as previously described. The methods may further include compressing the stand-alone solid-state electrolyte film against a surface of the electrode film to form a laminate of the electrode film and the solid-state electrolyte film. Compression of the stand-alone solid-state electrolyte film against a surface of the electrode film to form the laminate may occur by any suitable method for compressing or laminating films include, for example, calendering.

A solid-state electrolyte 3 may be contacted with a cathode 2, optionally a cathode active material. A cathode includes at least a cathode active material and a current collector such as a cathode current collector 40. The solid-state electrolyte 3 is optionally laminated to a cathode 2 on a side opposite the cathode current collector 40. When using the solid-state electrolyte 3 in a solid state battery, difficulties arise in obtaining sufficient contact between the solid-state electrolyte 3 and the cathode 2. To solve this problem, the inventors have found that intermixing the cathode active material with a solid Li ion conductor, optionally LPS, $LiNbO_3$ or combinations thereof, improves this connection for improved ionic conductivity. Thereby, in the formation of a cathode 2, a cathode active material powder is optionally intermixed with or coated with LPS. Such intermixing shows significantly improved results, particularly when used with cathodes that are formed by dry processes such as those described in WO/2017/197299.

The solid-state electrolyte 3 can be used with many electrochemically active cathode active materials. Illustrative active electrode materials include nickel manganese cobalt (NMC622, NMC811, NMC532) (a.k.a. NCM or NMC), lithium manganese spinel (LMO), lithium nickel manganese spinel (LNMO), lithium nickel cobalt aluminum oxide (NCA), lithium iron phosphate (LFP), lithium iron manganese phosphate (LmFP), lithium cobalt oxide (LCO), and graphite formulas, or combinations thereof. In particular examples, an electrochemically active material is one or more NCM or LCO materials, optionally at the exclusion of one or more other electrochemically active materials.

In embodiments, an electrode active material is optionally coated or compounded with a solid Li-ion conductor such as LPS, for example, such that the electrode film is a composite of the electrolyte material and the active material. The electrolyte material of the cathode 2 may be the same as or different from the electrolyte material in the solid-state electrolyte 3. Coating is optionally on a powder form electrode active material prior to combination with a binder or coating or otherwise contacting a current collector substrate. Powder electrode active material may be combined with LPS powder (for example) where the electrode active material is present as a predominant. The materials may be premixed such that the electrode active material is coated with the LPS. The premixed material may then be combined with a binder, optionally a fibrillizable binder, to form the final cathode active material according to some aspects.

Figure 6:
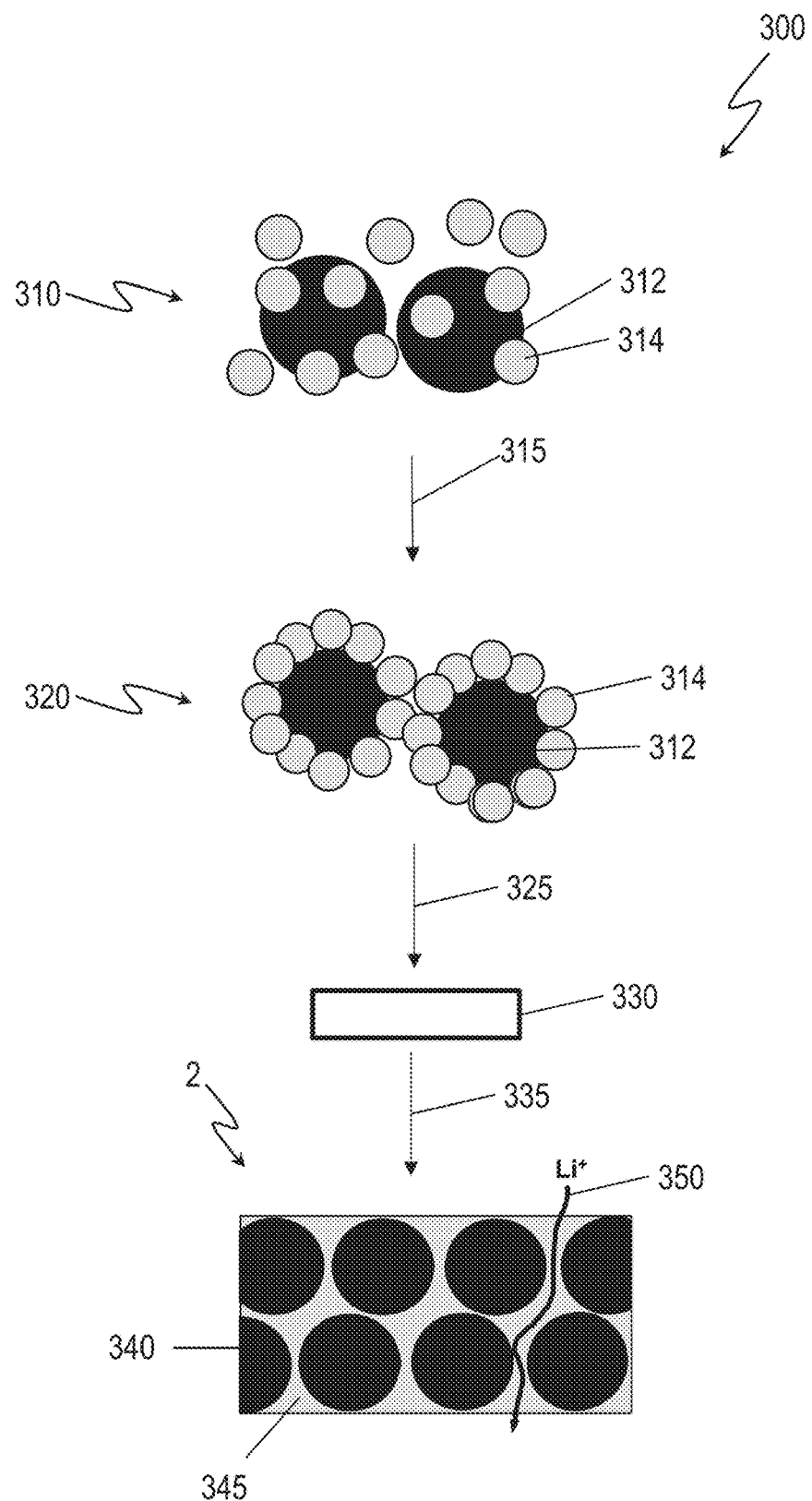
FIG. 6 is a schematic process to form a composite cathode film incorporated with solid-state electrolyte.

Referring to FIG. 6, an example coating process 300 for electrode active material is provided, leading to formation of an electrode material that subsequently may be compressed to form a cathode 2. In the example coating process 300, an electrode dry mixture 310 may be prepared by combining active material particles 312 and electrolyte material particles 314. The combined particles may then be processed in a step 315 by mixing, agitation, or milling, with or without heat, to form a composite 320 of the active material particles 312 coated with or substantially surrounded by the electrolyte material particles 314. In a step 325, optional additives such as binder or carbon may be added to the composite 320, and the resulting mixture 330 (shown in schematic) may be further mixed or processed, with or without heat, in preparation for compressing step 335. The compressing step 335 forms the cathode 2 as a composite film including regions of active material 340 within a matrix 345 including the electrolyte material and any optional additives such as binders or conductors such as carbon. The cathode 2 as the composite is thus suitable for transport of lithium ions 350 from one side of the cathode 2 to the opposite side of the cathode 2.

Binders such as polytetrafluoroethylene (PTFE) or polyvinylidene fluoride (PVdF) powders may be blended into the coated active materials and fibrillized under high-shear mixing. After fibrillization, the electrode materials can be processed into a free-standing film by feeding into a roll mill. The free-standing films may be laminated to metal foil current collectors, perhaps following additional passes through the roll mill to attain the desired electrode film thickness and porosity. An electrode film thickness may be from about 30 µm to about 500 µm, optionally about 50 µm to about 200 µm, optionally about 100 µm or more, optionally about 50 µm or more.

In embodiments, the composite cathode powder including the active material is blended with carbon and dry PTFE binder powder with a starting formulation of "active/carbon/PTFE=82/10/8". The blend may be calendered to form a free-standing film at a suitable speed, such as 0.5 meter/min, and at a suitable pressure, such as 3000 psi.

The cathode film may be laminated to aluminum foil to form a cathode through the calender machine.

According to embodiments, the solid-state electrolyte powder and PTFE binder powders may be blended with a binder content of 5 wt. % to 10 wt. %. In embodiments, the composite cathode films may be formed by compressing the blend using a hydraulic press at a pressure such as 360 MPa. The composite cathode film can also be prepared by passing the blend through a jeweler mill at a pressure of from 1000 psi to 3000 psi.

In embodiments of the methods for preparing an electrode such as a solid-state electrode 1, the electrolyte material of the electrolyte dry mixture, the electrode dry mixture, or both, may include an additive or dopant, such as an air-stabilizing dopant, that stabilizes the electrolyte materials such as $Li_2S$—$P_2S_5$ and prevents degradation of the materials in air. Materials such as $Li_2S$—$P_2S_5$ often have low stability in air and must be handled in inert atmosphere during processing steps.

Air-stabilizing dopants that may improve the chemical stability of the sulfide electrolytes such as LPS in moist air, may be chosen based on the following principles: (1) The additive should have stronger water absorption ability than that of $Li_2S$ so that reaction between sulfides and moisture in the air can be suppressed; (2) The additive should suppress the formation of $H_2S$; (3) The $Li_2S$—$P_2S_5$ even with small amount of additives should still maintain a high ionic conductivity; (4) The additive should be stable with Li metal to achieve a long-term cycling stability; and (5) The additive should be an electronic insulator to reduce the self-discharge rate.

An example air-stabilizing dopant may include ZnO as an additive to stabilize lithium sulfides such as $75Li_2S\cdot25P_2S_5$. Further examples of air-stabilizing dopants include CaO and $ZrS_2$. Both CaO and $ZrS_2$ are inert to Li metal. CaO has stronger capability for absorbing the moisture than ZnO and also has larger negative Gibbs energy change (ΔG) for the reaction with $H_2S$ in improving the sulfide stability. $ZrS_2$ is intrinsically stable in water and air.

Doped, air-stabilized sulfide powder, $Li_2S$ and $P_2S_5$ (75/25) may be synthesized by ball-milling at 500 rpm for 10 hours (Retsch PM-100 Planetary Mill). The solid electrolyte powder may be mixed with from 0 to 10 wt. % ZnO, $ZrS_2$, or CaO dopant by a second ball milling process.

A cathode is optionally formed by adding an engineered porosity carbon material as a processing additive along with activated carbon or in place of activated carbon with a fibrillizable binder material in a dry process cathode manufacturing method. Optionally, a processing additive is not activated carbon. A processing additive optionally has a surface roughness on a dimensional scale that is within 10% to 250% of that found in PTFE fibers. Such a surface is rough on a dimensional scale where roughness is defined as a plurality of hills and valleys on the surface of the processing additive. In some aspects of the disclosure, a surface roughness defines a porous surface structure, optionally a surface structure having high porosity. High porosity is defined as a pore diameter of about 10 nm to about 1000 nm having a cumulative pore volume of about 0.8 mL/g to about 2.5 mL/g, or having a porous structure with a density of about 1500 $kg/m^3$ to about 2500 $kg/m^3$. Optionally, the cumulative pore volume is about 1.0 mL/g to about 2.5 mL/g, optionally about 1.2 mL/g to about 2.2 mL/g, optionally with a pore diameter of about 10 nm to about 1000 nm. In some aspects, the processing additive has a cumulative pore volume of optionally of or greater than 0.8 mL/g, optionally about 0.9 mL/g, 1.0 mL/g, 1.1 mL/g, 1.2 mL/g, 1.3 mL/g, 1.4 mL/g, 1.5 mL/g, 1.6 mL/g, 1.7 mL/g, optionally 1.8 mL/g, 1.9 mL/g, 2.0 mL/g, 2.1 mL/g, 2.2 mL/g, 2.3 mL/g, 2.4 mL/g, 2.5 mL/g. For comparison, activated carbon has a pore volume of about 0.9 mL/g. The processing additive for example, without limitation, may have a porosity of about 30 vol. % to about 40 vol. %, or any value or range therebetween, optionally about 35 vol. % to about 40 vol. %, optionally about 30 vol. %, 31 vol. %, 32 vol. %, 33 vol. %, 34 vol. %, 35 vol. %, 36 vol. %, 37 vol. %, 38 vol. %, 39 vol. %, 40 vol. %.

Examples of a processing additive as used herein include carbon materials. Examples of carbon materials include graphitized carbon and activated carbon. Further examples of carbon materials include a silica-templated high-porosity optionally graphitized carbon material. Example carbon materials may have a particle size distribution optionally peaking in about the 3 micrometer (µm) to about 5 µm range. In some aspects, the BET area of the carbon material may be much less than that of conventional AC. In some embodiments, the carbon material is not activated and thus is less hydrophilic than AC. The graphitization process imparts mechanical strength comparable to the pyrolized highly-cross linked cellulosic precursor sources used to form AC. An illustrative example of a processing additive such as porous carbon is sold as POROCARB by Heraeus Quarzglas GmbH & Co. KG, Kleinostheim, Germany.

A manufacturing method for exemplary porous carbon particles for use as a processing additive herein may be found in U.S. Pat. No. 9,174,878. In general, a porous metal oxide template of agglomerated or aggregated metal oxide nanoparticles is first produced by hydrolysis or pyrolysis of a starting compound by means of a soot deposition process. The pores are infiltrated with a carbon precursor substance. After carbonization, the template is again removed by etching. What remains is a porous carbon product having a hierarchical pore structure with platelet-like or flake-like morphology.

In some aspects of the disclosure, a processing additive is a hard carbon with mechanical properties similar to activated carbon with regard to properties such as particle strength, particle morphology, or surface roughness, which may contribute to the electrode processibility, but with lower porosity, lower surface area (e.g., as measured by gas adsorption), or less hydroscopic than activated carbon. An illustrative example of a hard carbon is sold as LBV-1 Hard Carbon from Sumitomo Bakelite Co., LTD. Such a material may be obtained from pyrolizing highly cross-linked cellulosic precursors. Whereas commercial 'activated carbon' materials are subjected to a pore-forming activation process prior to particle size reduction and classification, the desired exemplary processing additive may be formed by excluding the activation process. The exemplary processing additive optionally has a BET surface area less than 200 $m^2/g$ and preferably less than 20 $m^2/g$, compared to areas greater than 800 $m^2/g$ for commercial activated carbon.

A processing additive has a particle diameter. It is preferred that particle diameters of 50 μm or less are used. Optionally, a processing additive has an average particle diameter of 1 μm to 50 μm, optionally 1 μm to 30 μm, optionally 1 μm to 25 μm, optionally 1 μm to 20 μm, optionally 1 μm to 5 μm, optionally 3 μm to 10 μm.

A processing additive is optionally present at an amount such as 20% to 75% the amount of binder used to form the electrode. Optionally, the processing additive is present at a 30% to 60%, optionally, 40% to 70%, optionally 50% to 70%, the amount of binder. In some aspects of the disclosure, the processing additive is used to the exclusion of activated carbon. Optionally, the processing additive replaces some amount of activated carbon, but the processing additive and the activated carbon are used together.

A processing additive is optionally included at an amount relative to an overall weight of the electrode material. An overall amount of processing additive is optionally from 2 wt. % to 10 wt. %, optionally from 2 wt. % to 6 wt. %, optionally from 4 wt. % to 8 wt. %, optionally at 5 wt. %, based on the total weight of the electrode material. In some aspects of the disclosure, the overall concentration of processing additive is optionally greater than or equal to 5 wt. %, optionally 5 wt. % to 8 wt. % or greater than 8 wt. %, optionally when blended with an active material such as LFP, NMC, LmFP, or the like.

In some aspects, an electrode includes a conductive carbon. The conductive carbon as used herein may be an activated carbon (AC) as is otherwise described herein. The dispersed conductive carbon network may be described in some cases as "chain of pearls." In other cases conductive carbons may be high aspect ratio fibers or platelets that can wrap powders and/or form a web type network. In some aspects, electrodes may use combinations of conductive carbons. On the other hand, activated carbon generally refers to very high surface area microporous materials. Conductive carbons may or may not be porous but in many cases are also high surface area but with more of the surface area due to exterior of small particles rather than internal pore volume as is the case for activated carbons. Commercial activated carbons are generally much larger particles than conductive carbons.

The inventors discovered that mere combining of a processing additive with a LPS intermixed with active material and a binder resulted in poor dry process electrode active material. However, by dispersing the processing additive in the active electrode material or the fibrillizable binder and subsequently intermixing the previously omitted coated active electrode material or the fibrillizable binder improved the processing characteristics and electrochemical properties of the resulting electrodes. Thus, the combination of elements of a resulting film may require particular order and dispersion properties, without which the intermixing of the processing additive with the entire set of materials was non-optimal. In embodiments, the electrode material may be processed by first intermixing the processing additive with either the binder or the coated active material prior to combination with the other.

The electrode active material (active, LPS, binder, optional carbon, optional processing additive) is formed prior to coating onto a current collector. A current collector is optionally a metal foil. A metal foil current collector may be an aluminum foil, a copper foil or optionally another conductive metal foil. In some aspects, the electrode active material is a free flowing powder prior to coating onto a current collector. Optionally, an electrode active material is formed into a free standing film then laminated to a current collector. In some aspects, the electrode precursor materials herein contain no more water or other liquid solvent than the ambient atmosphere, optionally less than 1% of any liquid including for example solvents, water, ethanol, or the like. The improved processibility of the materials formed using the processing additive and by methods as described herein is further enhanced by the dry aspects of the materials that provide more rapid overall electrode manufacture.

The electrode dry mixture or electrode precursor material may be subsequently passed through a 355-micron sieve before formation into a free-standing film. Once the electrode precursor material is formed, the electrode precursor material is fed into a roll mill and calendered to form a free-standing film. The free-standing film may be formed by calendering the free flowing electrode precursor material at a roll temperature and roll speed under a hydraulic pressure. The roll temperature may be from about room temperature (20° C.) to about 180° C. A higher the roll temperature may result in a thinner free-standing film on the first pass compared to a lower temperature. Additionally, the roll speed may be set from about 0.17 m/min to about 1.3 m/min. A slower roll speed may result in a thinner free-standing film on the first pass compared to a faster roll speed. A hydraulic pressure of about 1,000 psi to about 7,000 psi may be used. A higher pressure may result in a thinner free-standing film on the first pass compared to a lower pressure. Additional passes through the roll mill may continue to reduce the film thickness until desired thickness and loading are obtained. In some aspects of the disclosure, an example, without limitation, film thickness may be about 50 μm to about 150 μm, optionally about 50 μm, to about 100 μm, optionally about 100 μm to about 150 μm, optionally about 50 μm, about 55 μm, about 65 μm, about 70 μm, about 75 μm, about 80 μm, about 85 μm, about 90 μm, about 95 μm, about 100 μm, about 105 μm, about 110 μm, about 115 μm, about 120 μm, about 125 μm, about 130 μm, about 135 μm, about 140 μm, about 145 μm, or about 150 μm. In some aspects of the disclosure, an example, without limitation, desired loading may be about 19 $mg/cm^2$ to about 21 $mg/cm^2$, optionally about 19 $mg/cm^2$, optionally about 20 $mg/cm^2$, or optionally about 21 $mg/cm^2$.

The free-standing film may be laminated on a substrate such as a metal foil current collector to form an electrode. Lamination may occur by rolling the free-standing film together with the metal foil current collector at a roll temperature and roll speed under a hydraulic pressure. The roll temperature is preferably about 100° C., or optionally 80° C. or 90° C. It is appreciated that the higher the roll temperature the greater the likelihood of blistering and poor adhesion. Similarly, the lower the roll temperature, the worse the adhesion. Additionally, the roll speed may be from about 0.17 m/min to about 1.3 m/min, optionally about 0.5 m/min. Finally, the hydraulic pressure may be set from about 500 psi to about 2,000 psi. The pressure is set to promote adhesion to the substrate but not such that the chemical properties, for example loading and porosity, are altered. When the pressure is set too high, the chemical properties are affected, but when the pressure is set too low adhesion may not occur.

The processes and electrode films produced thereby achieve a dry manufacture method that creates excellent electrochemical properties to resulting electrodes suitable for use in lithium ion or other cells.

The solid-state electrode 1 prepared as described herein may be further processed to form multilayer functional structures such as electrochemical cells and solid-state batteries. Accordingly, embodiments include electrochemical cells or batteries having at least one solid-state electrode 1 as previously described. As previously described, a cathode 2 may be laminated to a solid-state electrolyte 3 as provided herein. Optionally, a stand-alone solid-state electrolyte 3 film may be laminated onto the cathode 2 to form a cathode/SSE bi-layer coupon by controlling the calender roll gap, pressure, and speed. The resulting bilayer structure uses the cathode as a mechanical support and enables a thin SSE film on top to be strong and flexible.

Figure 7:
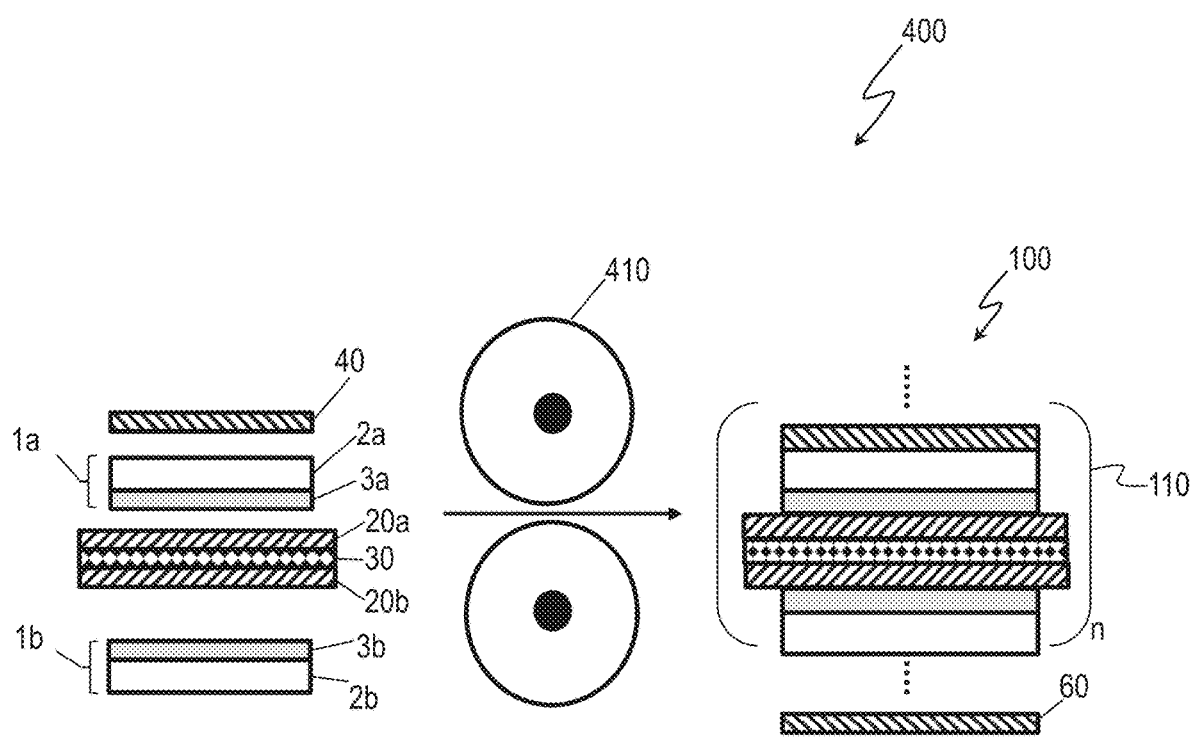
FIG. 7 is a schematic of a lamination process for forming a multilayer battery stack including an anode, current collectors, and solid-state electrodes according to embodiments.

The cathode/SSE bi-layer or solid-state electrode 1 may be further processed to form additional layer structures. For example, referring to FIG. 7, in an example lamination process 400, separate layers such as a cathode current collector 40, a first solid-state electrode 1a, a first anode 20a, an anode current collector 30, a second anode 20b, and a second solid-state electrode 1b, may be laminated together. The lamination of the layers may occur after first physically stacking the layers, then compressing the layers such as by passing the layers through a calendering roll 410. The lamination process may occur in multiple steps, such as one layer at a time, or in fewer steps, by which multiple layers may be laminated in a single pass. The lamination steps result in a structure such as the solid-state battery 100 having a multicell battery stack 110, as previously described. Multiple process repetitions may occur to increase the number of cells (n) in the multicell battery stack 110.

A cathode film serves as the substrate for fabricating the SSE layer in a sequential roll mill operation. In the second dry process step, the same sulfide is applied, consolidated and laminated to the cathode. This approach may impart a continuous and low impedance interface to the cathode. In such processes, there is no need to handle free-standing cathode or need for subsequent application of heat or pressure. The polymer content, although low, may provide the flexibility needed to accommodate strain mismatches between the cathode and the anode associated with lithiation/delithiation and/or thermal expansion.

In embodiments, the bilayer film or solid-state electrode 1 can be laminated to a suitable counter electrode, optionally Li foil, to form a multi-layer stack which is suitable for high volume production of a solid-state battery. The resulting cathodes and solid-state electrolytes may be used in any suitable solid state battery configuration. Illustrative configurations include coin cells, pouch cells, or other cell configuration as known in the art.

In some embodiments, the bilayer film or solid-state electrode 1 may be laminated to a counter electrode such as an anode 20 including an anode protective layer 50. The anode 20 may include Li foil, for example. The anode protective layer 50 may be a substance such as a ceramic that prevents degradation of the anode 20 or that reduces interfacial stresses between the anode 20 and a solid-state electrolyte 3 of the solid-state electrode 1 laminated to the anode 20. Non-limiting examples of materials suitable as the anode protective layer 50 may include LiPON. The anode protective layer 50 may have any thickness that accomplishes the purpose of protecting the anode 20 without substantially degrading current flow or ion transport across the solid-state electrolyte 3. The anode protective layer 50 may have a thickness of up to 0.1%, up to 0.5%, up to 1%, up to 2%, up to 5%, up to 10%, up to 20%, up to 30%, or up to 40% the thickness of the anode 20. Example lamination processes are described with reference to FIGS. 8 and 9.

Figure 8:
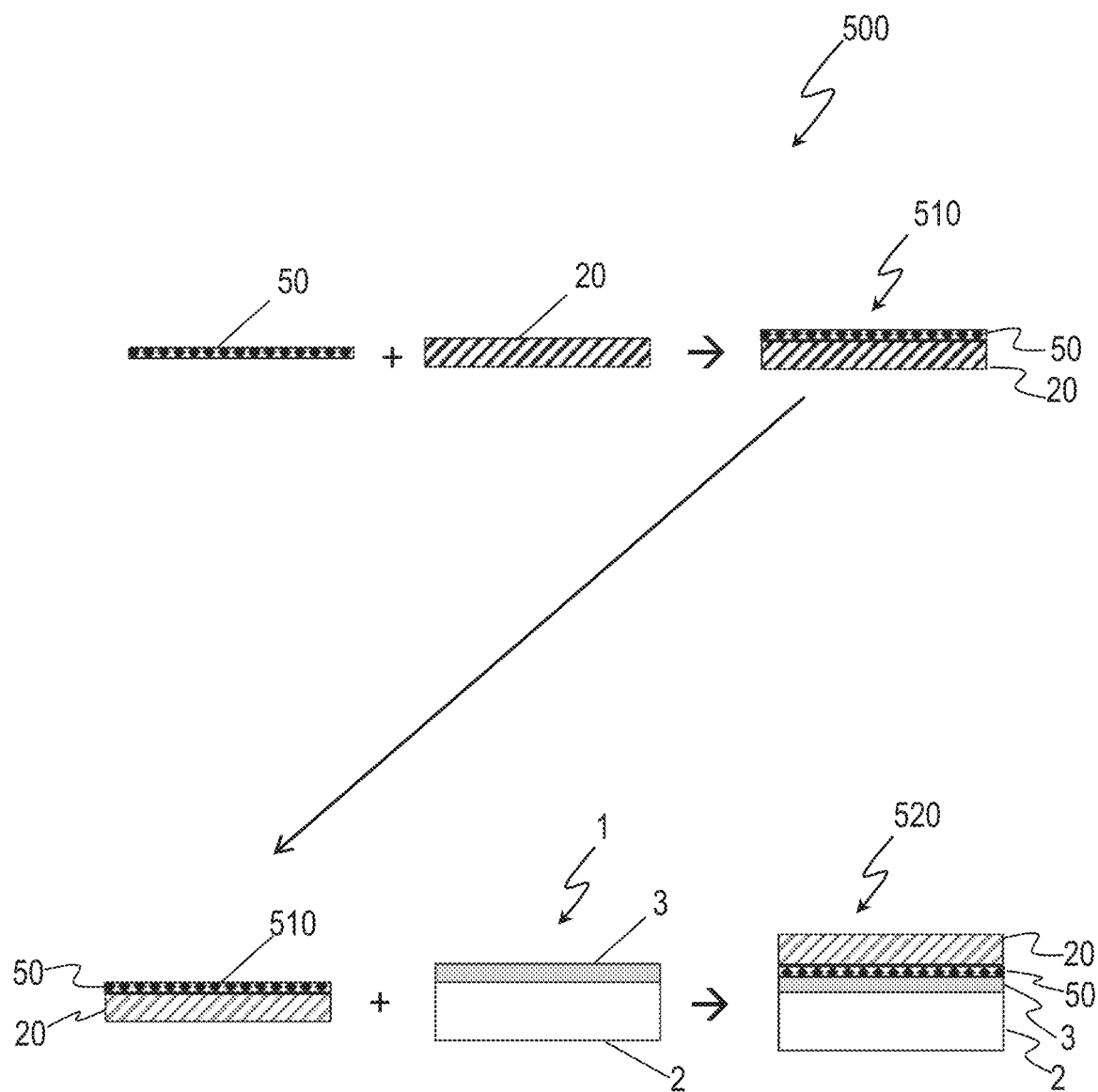
FIG. 8 is a schematic of a process for preparing an electrochemical cell including a solid-state electrode and an anode having an anode protective layer.

Referring to FIG. 8, in a first example lamination process 500, an anode protective layer 50 is applied to a surface of an anode 20 to form a bilayer 510. The anode protective layer 50 may be applied to the surface by any deposition method such as physical vapor deposition, chemical vapor deposition, or sputtering, for example. The bilayer 510 is then laminated to a solid-state electrode 1 according to embodiments of this disclosure to form a cell 520. The lamination is conducted with the anode protective layer 50 of the bilayer 510 facing the solid-state electrolyte 3 of the solid-state electrode 1. The lamination may be accomplished by any technique suited for joining films such as, for example, passing the bilayer 510 and the solid-state electrode 1 through calendering rolls.

Figure 9:
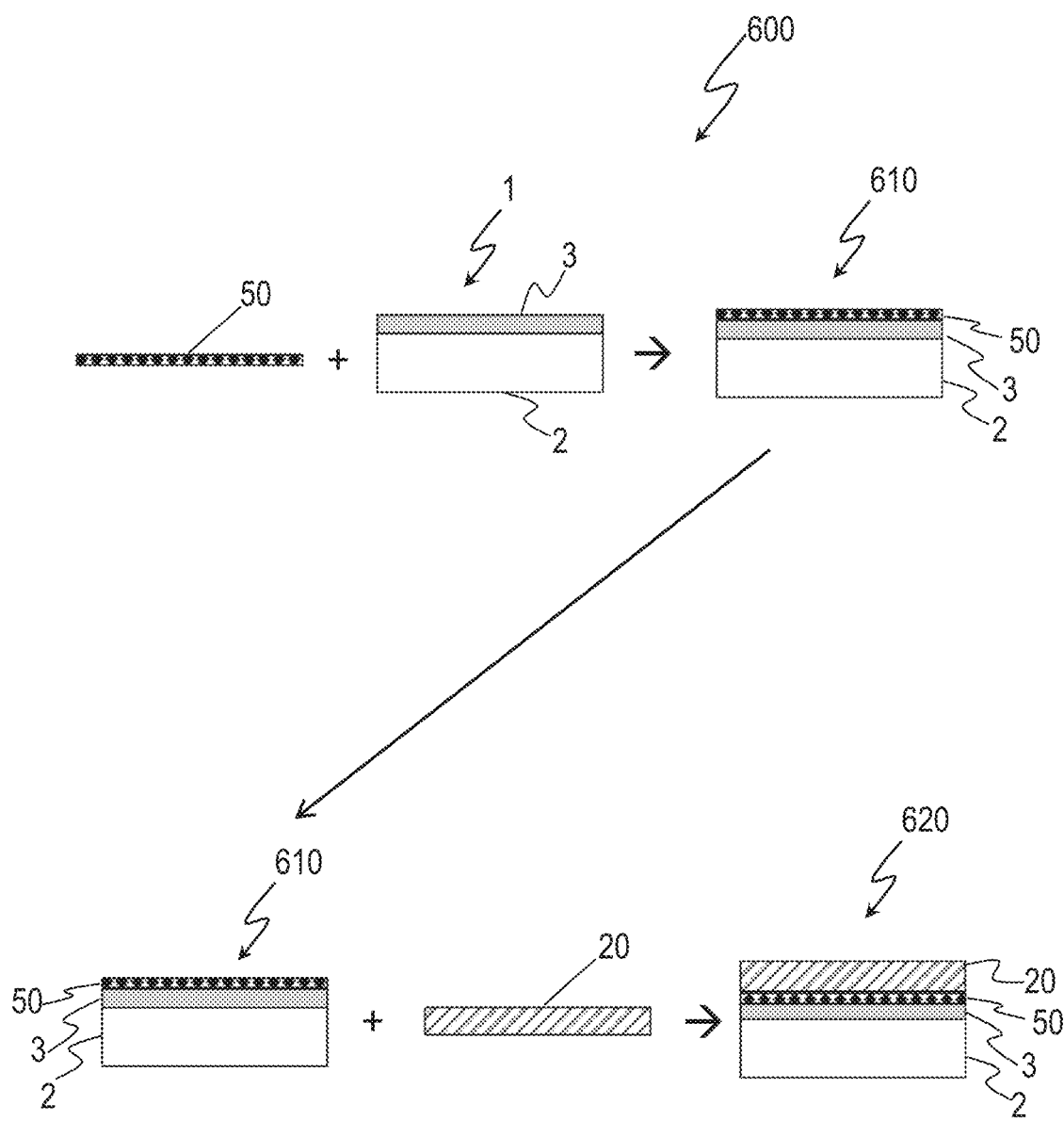
FIG. 9 is a schematic of an additional process for preparing an electrochemical cell including a solid-state electrode and an anode having an anode protective layer.

Referring to FIG. 9, in a second example lamination process 600, an anode protective layer 50 is applied to a surface of a solid-state electrode 1 according to embodiments of this disclosure and including a cathode 2 and a solid-state electrolyte 3 to form a trilayer 610. The anode protective layer 50 may be applied to the surface by any deposition method such as physical vapor deposition, chemical vapor deposition, or sputtering, for example. The trilayer 610 is then laminated to an anode 20 to form a cell 620. The lamination is conducted with the anode protective layer of the trilayer 610 facing the anode 20. The lamination may be accomplished by any technique suited for joining films such as, for example, passing the trilayer 610 and the anode 20 through calendering rolls.

Various aspects of the present disclosure are illustrated by the following non-limiting examples. The examples are for illustrative purposes and are not a limitation on any practice of the present disclosure. It will be understood that variations and modifications can be made without departing from the spirit and scope of the disclosure. Reagents and materials illustrated herein are obtained from commercial sources unless otherwise indicated.

EXAMPLES

Example 1

Solid-State Electrode Fabrication

For formation of an exemplary SSE, $75Li_2S\text{-}25P_2S_5$ solid electrolyte was prepared by a mechanical milling method. A mixture of 75 mol. % of lithium sulfide ($Li_2S$, 99.98%, Sigma-Aldrich) and 25 mol. % of phosphorus pentasulfide ($P_2S_5$, Sigma-Aldrich) was milled in a zirconia ($ZrO_2$) jar using a planetary ball mill. A highly conductive $75Li_2S\text{-}25P_2S_5$ glass electrolyte powder was formed. The obtained LPS glass electrolyte powder was annealed in Ar at 270° C. to form a LPS glass-ceramic electrolyte having greater conductivity than the LPS glass electrolyte powder.

Figure 10:
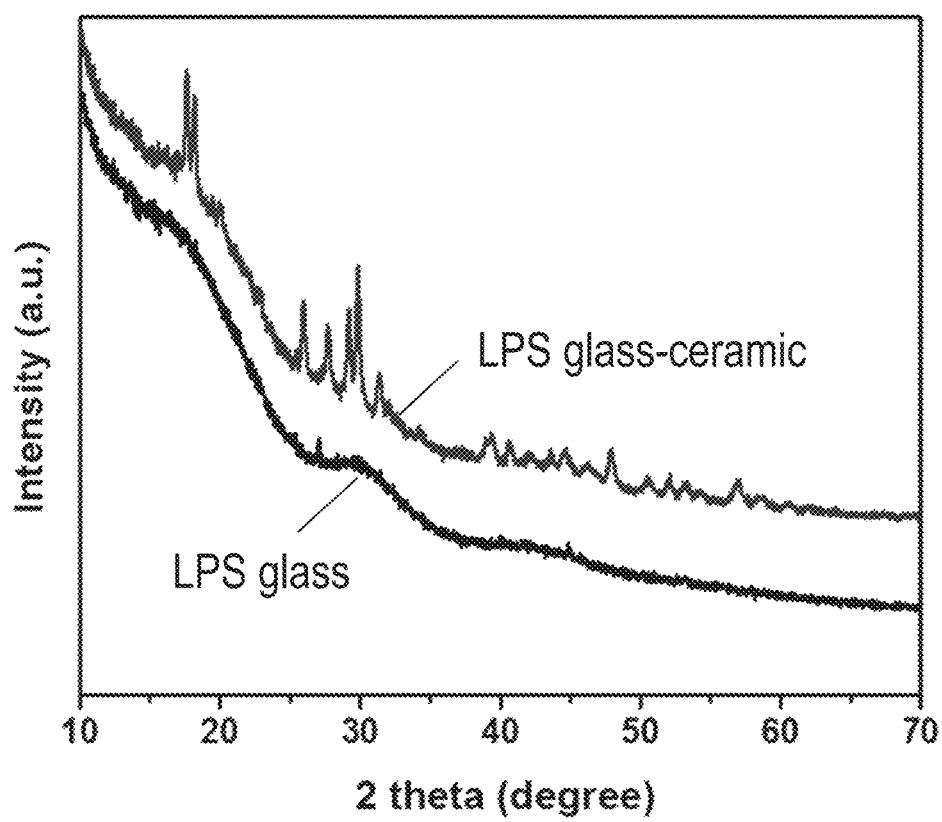
FIG. 10 is a stacked x-ray diffractogram of lithium phosphorus sulfide $75Li_2S \cdot 25P_2S_5$ (LPS) solid electrolytes in a glass state before annealing and a glass ceramic state after annealing.

X-ray diffraction (XRD) was performed on the LPS glass electrolyte powder and the LPS glass electrolyte powder using a Bruker D8 ADVANCE XRD. XRD patterns of a LPS-glass and a glass-ceramic electrolyte are shown in FIG. 10. There is no sharp peak in the pattern of the glass electrolyte, indicating non-crystalline structure of as-prepared LPS-glass. The broad peaks from 10° to 40° are from the polymeric sample holder (background). After the 270° C. annealing, some sharp peaks appear in the XRD of the LPS glass-ceramic material, indicating the existence of crystalline structure. Without intent to be bound by theory, it is believed that the crystalline structure may enhance the conductivity of the electrolyte, but with possible trade-off of desirable mechanical properties.

Figure 11:
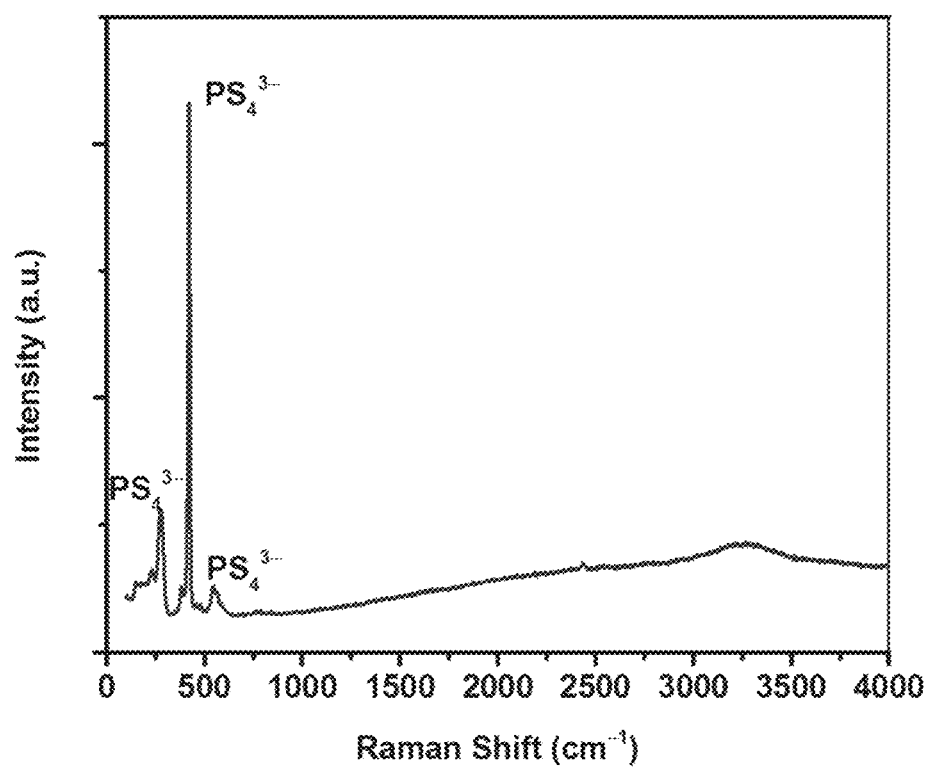
FIG. 11 is a Raman spectrum of the LPS solid electrolyte.

Raman spectra of the LPS glass-ceramic powder were collected on a Horiba ARAMIS Raman. The Raman spectra confirmed the $Li_3PS_4$ structure of the material, which contributes to a high ionic conductivity in this example. Referring to FIG. 11, Raman spectra of the LPS glass-ceramic electrolyte confirmed the presence of $PS_4^{3-}$ groups in the electrolyte.

Figure 12:
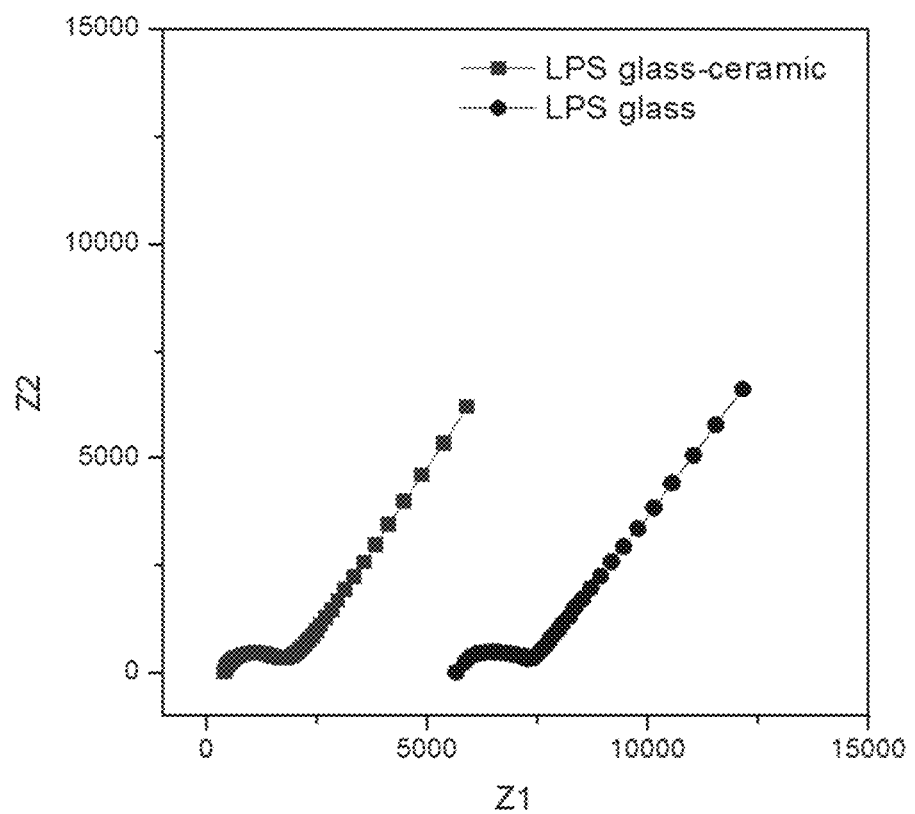
FIG. 12 is a side-by-side impedance plot comparing LPS in glass state and LPS in glass-ceramic state.

Ionic conductivity of the LPS glass material and the LPS glass-ceramic material SSE material were measured from a Pt/LPS/Pt cell using electrochemical impedance spectroscopy (EIS). The powders were cold pressed to form pellets with 1 mm thickness and 10 mm diameter. An ion-blocking Pt/$Li_3PS_4$/Pt cell was then prepared by sputtering the electrolyte pellet with platinum. AC impedance of the cells were measured from $10^5$-$10^{-2}$ Hz via a Solartron Impedance Analyzer. From the impedance plot of FIG. 12, ionic conductivity of the LPS glass material was calculated to be $3.2\times10^{-4}$ S/cm and the ionic conductivity of the LPS glass-ceramic material was calculated to be $1.3\times10^{-3}$ S/cm.

Figure 13:
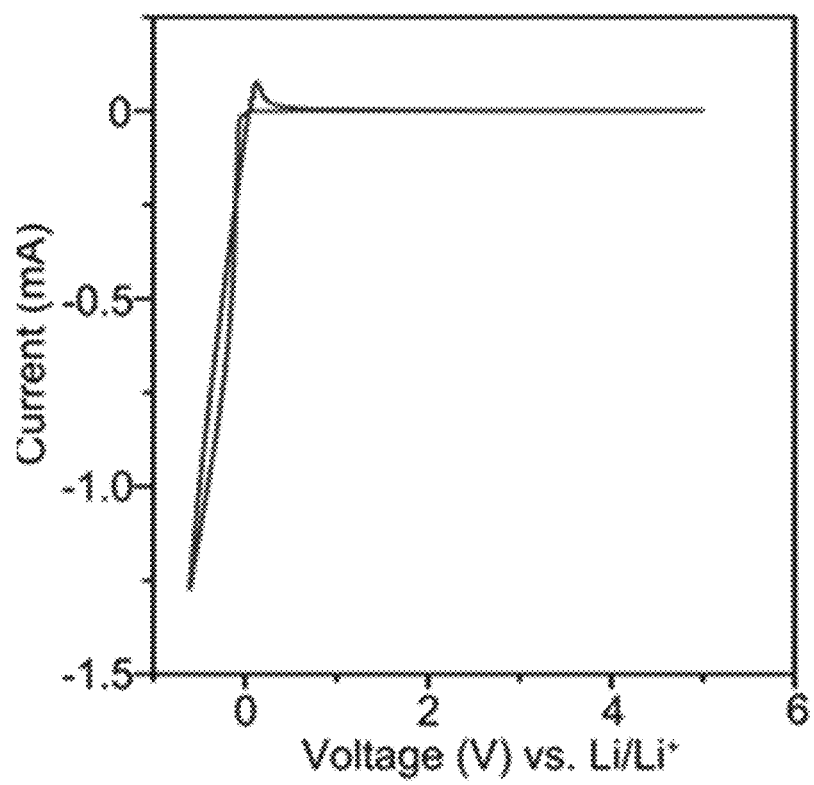
FIG. 13 is a cyclic voltammogram of a Pt/LPS/Li cell from −0.5 V to +5 V at a scan rate of 0.1 mV/s.

Cyclic voltammetry (CV) was performed on the LPS glass-ceramic material to evaluate its electrochemical stability. The electrolyte powder was cold pressed to form a pellet with 1 mm thickness and 10 mm diameter. Platinum was sputter coated on one side of the pellet. The coated pellet was then assembled into a cell with Li metal as counter/reference electrode. The Pt/LPS/Li cell was scanned from −0.5 V to +5 V vs. Li/$Li^+$ at a rate of 0.1 mV/s. Referring to FIG. 13, CV plot indicates the electrolyte intrinsic stability from 0 to +5 V on a non-active surface.

Lab scale solid state cells were assembled and evaluated for rate performance. The cells included the LPS as a solid state electrolyte, $LiCoO_2$ (LCO) as a cathode, and a Li metal foil as an anode.

The major difference between the SSB composite cathode and a standard Li ion cathode is that the composite cathode needs a solid Li-ion conductor in its structure for ionic conductivity. LCO active powder was premixed with LPS electrolyte powder in a weight ratio of 7:3. The mixture was then dry blended with carbon additive and PTFE binder. The dry blend was calendered to form a cathode film. A stand-alone cathode film was fabricated.

The stand-alone cathode film then was laminated to Al foil to form the cathode through the calender machine. The composite cathode loading was 3.0 mAh/$cm^2$ and its dimensions were 53 mm×94 mm.

Similar to the cathode film fabrication, formation of the SSE layer was achieved by dry blending the LPS powder with PTFE binder in a weight ratio of 1:1. Other examples use a LPS powder with PTFE binder in a weight ratio of 9:1. A stand-alone electrolyte film was formed by compressing 120 mg of the dry blend through a calender machine to form a 10 mm diameter LPS membrane. The film thickness was controlled to be 100 μm.

The stand-alone SSE film was laminated onto the cathode under 3 MPa pressure to form a cathode/SSE bi-layer coupon by controlling the calender roll gap, pressure, and speed. Subsequent studies formed a stack with dimensions over 60 mm×100 mm that meets the size requirement of a test pouch cell. Test cells were formed by combining the cathode/SSE bilayer with a Li anode. Two stainless steel rods were used as current collectors. The cells rested for 10 h prior to testing. The cell current density was controlled at ≤0.25 mA/$cm^2$ to avoid non-uniform Li volume change and Li dendrite growth.

Galvanostatic charge/discharge cycles were conducted using a battery cycler (LAND CT-2001A) from 2.7 V to 4.2 V at room temperature. The current density and specific capacity were calculated based on the weight of the LCO.

Figure 14:
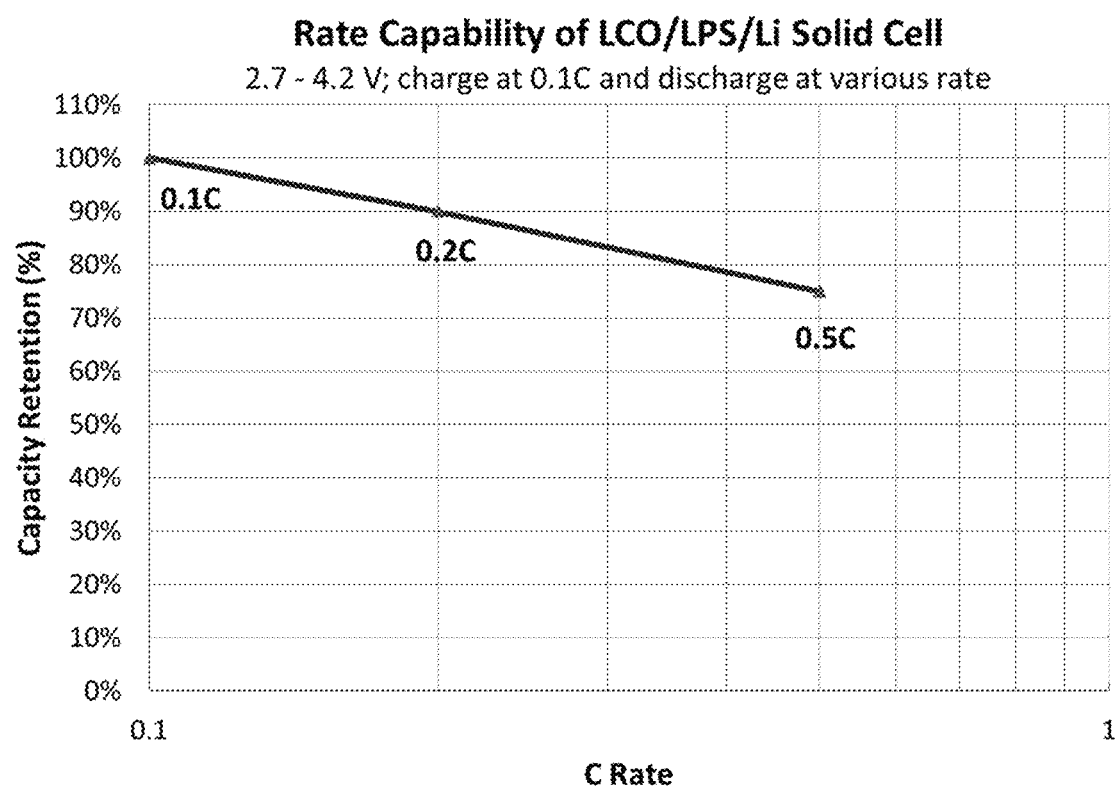
FIG. 14 is a graph of discharge rate capability for an electrochemical cell including a lithium cobalt oxide (LCO) cathode, an LPS sold-state electrolyte, and a Li anode. The cell was charged at C/10 rate and discharged at various rates (i.e., C/10, C/5, and C/2). The cut-off voltage was 4.2 V to 2.7 V.

For discharge rate capability testing, the cell was charged at C/10 rate and discharged at various rates (i.e., C/10, C/5, and C/2). Referring to FIG. 14, the cell exhibited 90% capacity retention at C/5 rate and 75% at C/2 rate, when compared to the initial capacity at C/10. These results confirm the capability of the solid cell to handle operation in a commercial battery.

Figure 15:
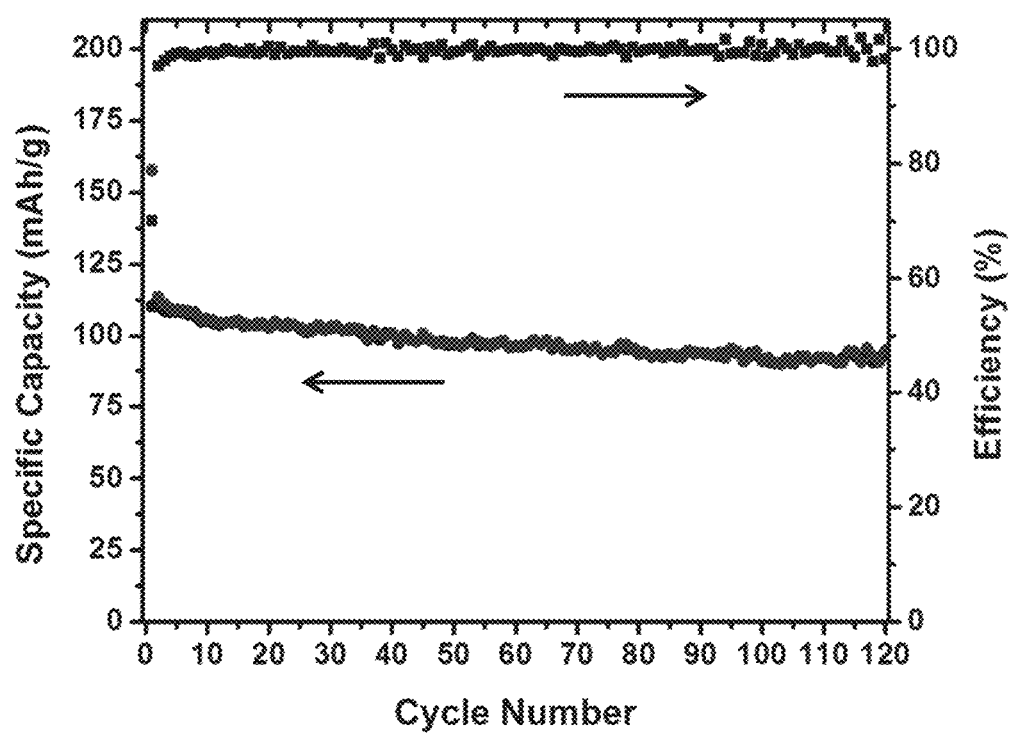
FIG. 15 is a graph of capacity and efficiency over number of cycles for a LCO/LPS/Li electrochemical cell.
Figure 16:
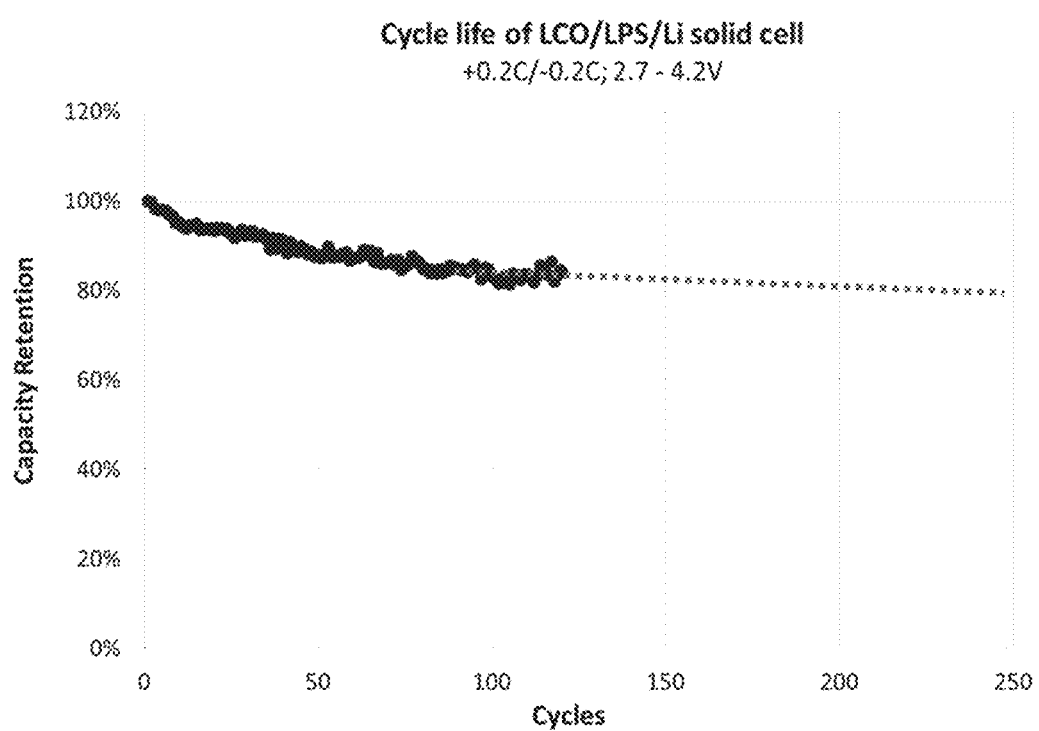
FIG. 16 is a graph of cycle life for a LCO/LPS/Li electrochemical cell at 2.7 V to 4.2 V and C/5.

The LCO shows a reversible capacity of 110 mAh/g in the solid cell, which is comparable to that in a conventional liquid electrolyte cell. An initial capacity loss (ICL) ranging from 18% to 30% was observed on the solid cells due to formation of passivation layers between the SSE and the electrodes. Cycle life of the cell was tested over 2.7 V-4.2 V at C/5 and at room temperature. The cell capacity and efficiency are shown in FIG. 15. The capacity retention vs. cycle number is shown in FIG. 16. The cell was cycled for 120 cycles with 85% capacity retention. The cycling efficiency stabilized at >99.5%. A cycle life of 250 is projected from the cell cycling trend.

Example 2

Fabrication of Pouch Cell Including Solid-State Electrolyte

Figure 17:
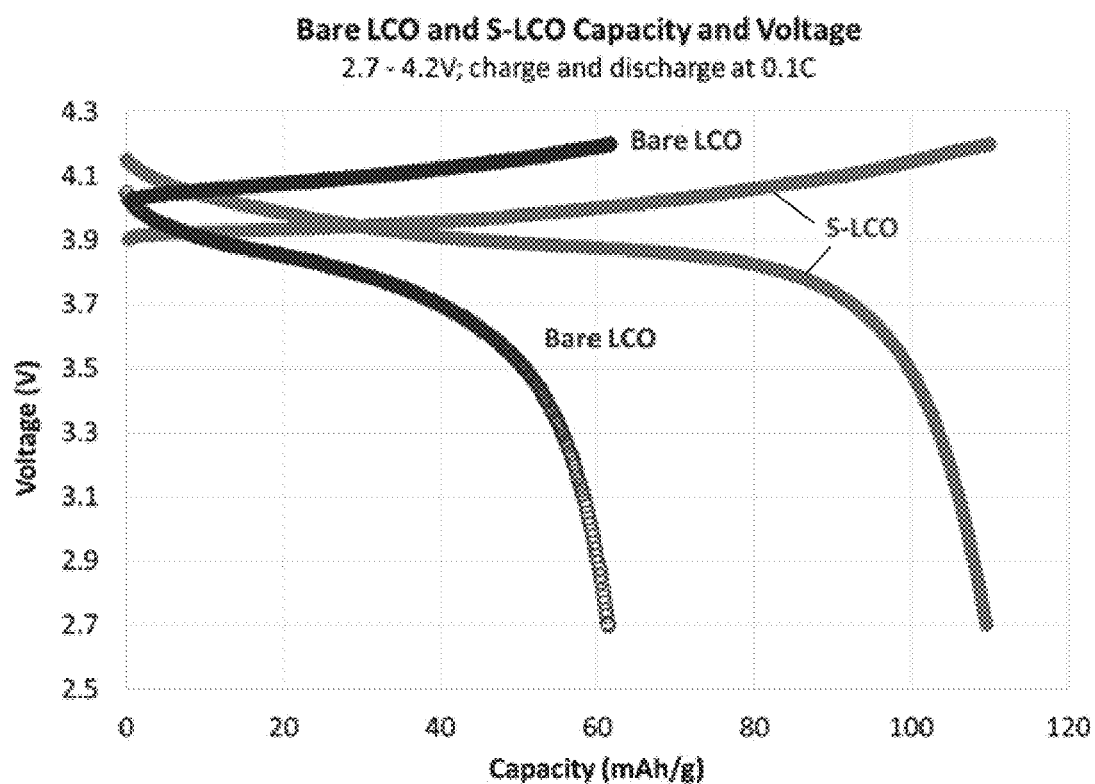
FIG. 17 is a charge and discharge voltage profile of two LCO cathodes from 2.7 V to 4.2 V at C/10.

As a further example, 250 mAh pouch cells were fabricated. For the cathode and SSE fabrications, 100 grams of SSE powder was required. A Retsch Planetary Ball Mill PM200 and two 125 mL jars were used to produce the SSE powder. Non-coated LCO powder was used as the cathode material. Without a metal oxide buffering layer, the space-charge layer between LCO and LPS introduces a significant increase of interfacial resistance. Under the same condition, the bare LCO cathode shows 45% lower capacity than the S-LCO ($LiNbO_3$ modified) capacity in solid cells (i.e., 60 mAh/g vs. 110 mAh/g). The bare LCO also shows higher polarization than the S-LCO. The voltage profiles of the two cathodes are shown in FIG. 17 for comparison.

A major difference between the SSB composite cathode and a standard Li ion cathode is that the composite cathode needs a solid Li ion conductor in its structure for ionic conductivity. LCO active powder was premixed with LPS electrolyte powder with ratio of 7:3. The mixture was then dry blended with carbon additive and PTFE binder. The dry blend was calendered to form a cathode film. With parameter investigation including calender gap, speed, and pressure, a stand-alone cathode film was fabricated.

The stand-alone cathode film was then laminated to Al foil to form the cathode through the calender machine. The composite cathode loading is designed to be 3.0 mAh/$cm^2$ and its dimension is 53 mm×94 mm.

Similar to the cathode film fabrication, the LPS powder was dry-blended with PTFE binder with a weight ratio of 1:1. A stand-alone electrolyte film was formed by compressing the dry blend through a calender machine. The film thickness was controlled to be 100 μm. The stand-alone SSE film was laminated onto the cathode to form a cathode/SSE bi-layer coupon by controlling the calender roll gap, pressure, and speed.

After forming the cathode/electrolyte bi-layer film, a Li metal anode was laminated to the bi-layer coupon to form "Li-SSE-Cathode" tri-layer stack having dimensions of over 60 mm×100 mm. All the processes, including electrode fabrication, electrolyte fabrication, and tri-layer stack lamination, were determined to be readily scalable to a roll-to-roll operation.

A double-layer-pouch (DLP) cell was fabricated by laminating a double-sided LCO cathode between two electrolyte films laminated to each side. Two single-sided Li-metal anodes (on Cu foil) then were laminated to the cathode/electrolyte coupon to form a stack having layers Cu—Li/LPS/LCO-Al-LCO/LPS/Li—Cu. The current collector was ultrasonically welded to a heat sealable tab. This stack was heat sealed into an aluminum laminate pouch cell packaging to produce the DLP cell.

Example 3

Air-Stabilized Doped Electrolyte

An air-stable, doped electrolyte was prepared for use as the SSE material in electrochemical cells. The electrolyte from a mixture of 90 wt. % 75$Li_2$S-25$P_2S_5$ and 10 wt. % ZnO milled in a zirconia ($ZrO_2$) jar using a planetary ball mill. A highly conductive doped electrolyte powder was formed. The obtained doped electrolyte powder was annealed in Ar at 270° C. to form a doped glass-ceramic electrolyte powder having greater conductivity than the doped glass electrolyte powder.

Figure 18:
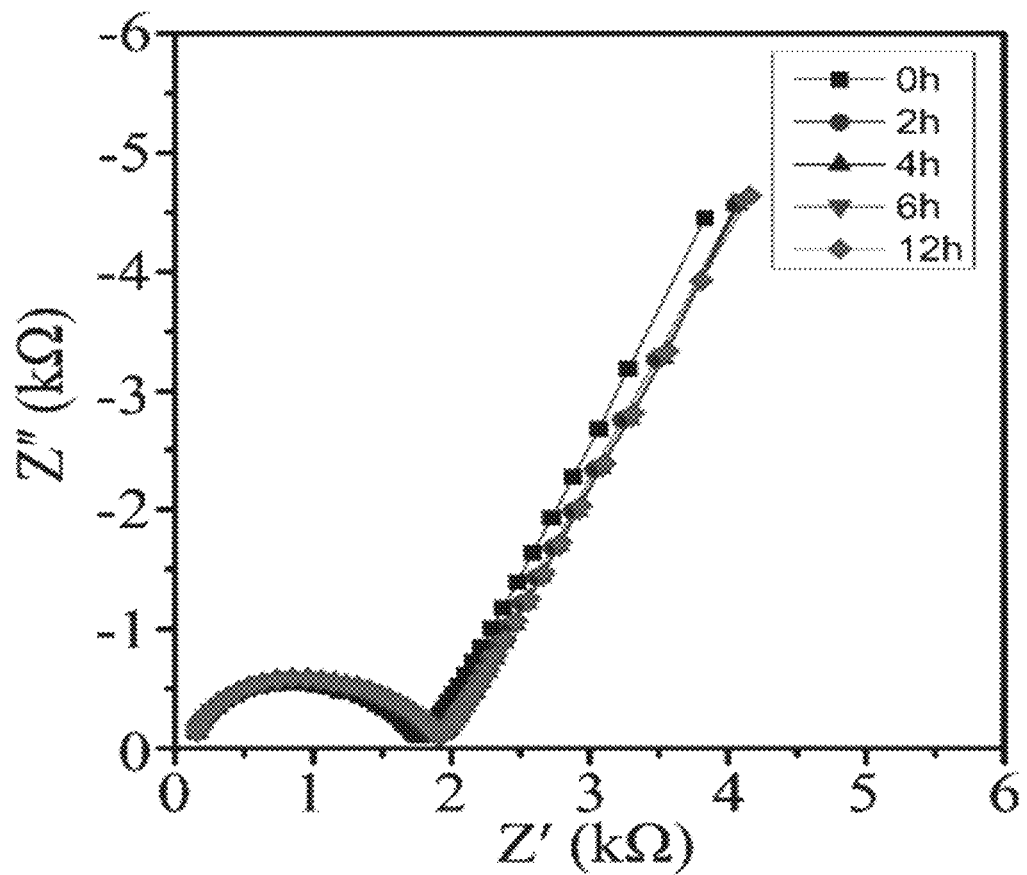
FIG. 18 is a graph of $Li^+$ ionic conductivity over time of LPS material doped with ZnO and exposed to air.

Ionic conductivity was measured on the doped glass-ceramic electrolyte powder at various time intervals after being exposed to air in a dry room, from an initial measurement after annealing to 12 hours after annealing. As shown in FIG. 18, the doped glass-ceramic electrolyte exhibited no appreciable change to its ionic conductivity after 12 hours. The tested sample had an initial $Li^+$ conductivity of less than $10^{-4}$ S/cm.

The maximum conductivity of liquid electrolytes, such as ethylene carbonate/dimethyl carbonate with 1-M $LiPF_6$, is on the order of $10^{-2}$ S/cm at 25° C., and the transport number of lithium ions is in the range of 0.2 to 0.5. Ionic conductivity on the order of $10^{-3}$ S/cm at 25° C. is desirable for solid state electrolytes to deliver performances similar to that of liquid electrolytes, considering that the transport number in solid state electrolyte is 1.0. The SSE films according to embodiments of this disclosure have been demonstrated to have sufficient ionic conductivity to bring the SSB power density up to that of commercial lithium-ion batteries with liquid electrolytes.

As electrode loadings are increased to meet energy density goals, the SSB capacity retention at higher rate may be limited by charge transport. A commercial battery typically operates at a rate less than or equal to C/2. Electrochemical cells and batteries including the SSE according to embodiments of this disclosure have improved conductivity to enable capacity retention at high loading. The solid state batteries according to embodiments further may include a stackable unit layer, a scalable cell form, a flexible cell design, and the ability to meet and control interfacial impedance over meaningful area or dimension. The solid state batteries may meet energy density requirements of greater than 250 Wh/kg and greater than 600 Wh/l with the unit stack.

The electrochemical cells and SSBs according to embodiment of this disclosure may have comparable cycle life to those of advanced high-energy Li-ion cells and at least double the cycle life of the high energy all-solid-state cells. Cycle life has been a key barrier to the commercialization of high energy all-solid-state batteries although low energy thin film SSB's achieve thousands of cycles. The cycle life limitation is ascribed to two root causes. One is poor electrochemical stability between electrolyte and electrodes, which results in the incremental resistance rise with cycling at the SSE/active interface. The second cause is the incompatible dimension changes between electrolyte and active materials, which also results in the incremental interfacial resistance increasing with cycling. The SSEs and SSBs according to embodiment may address both causes. The SSE film leads to both high density and elasticity, allowing a good contact between electrolyte and active materials through repeated lithiation/delithiation cycles.

Various modifications of the present disclosure, in addition to those shown and described herein, will be apparent to those skilled in the art of the above description. Such modifications are also intended to fall within the scope of the appended claims.

It should be appreciated that all reagents are obtainable by sources known in the art unless otherwise specified.

Patents, publications, and applications mentioned in the specification are indicative of the levels of those skilled in the art to which the disclosure pertains. These patents, publications, and applications are incorporated herein by reference to the same extent as if each individual patent, publication, or application was specifically and individually incorporated herein by reference.

The foregoing description illustrates particular aspects of the disclosure but is not meant to be a limitation upon the practice thereof.

What is claimed is:

1. An electrode comprising an electrode dry mixture and a dry electrolyte material intermixed with the electrode dry mixture; and a binder intermixed with said electrode dry mixture and said dry electrolyte material, said binder in the form of fibrils;
   wherein the electrode dry mixture comprises an active material, and
   wherein said dry electrolyte material comprises from 0.1% to 15% by weight air-stabilizing dopant, based on the total weight of the dry electrolyte material.

2. The electrode of claim 1, wherein the active material comprises nickel manganese cobalt, lithium manganese spinel, lithium nickel manganese spinel, lithium nickel cobalt aluminum oxide, lithium iron phosphate, lithium iron manganese phosphate, lithium cobalt oxide, graphite, or combinations thereof; and
   the dry electrolyte material comprises a lithium phosphorus sulfide glass ceramic.

3. The electrode of claim 1, wherein the dry electrolyte material comprises a glass ceramic.

4. The electrode of claim 1, wherein the dry electrolyte material comprises a lithium phosphorous sulfide glass ceramic.

5. The electrode of claim 1, wherein the dry electrolyte material comprises $Li_3PS_4$ glass ceramic.

6. The electrode of claim 1, wherein the air-stabilizing dopant is selected from the group consisting of ZnO, CaO, $ZrS_2$, and combinations thereof.

7. The electrode of claim 1, wherein the active material comprises nickel manganese cobalt, lithium manganese spinel, lithium nickel manganese spinel, lithium nickel cobalt aluminum oxide, lithium iron phosphate, lithium iron manganese phosphate, lithium cobalt oxide, graphite, or combinations thereof.

8. The electrode of claim 1, wherein the electrode further comprises a second electrolyte dry mixture compressed against a surface of the electrode to form an electrolyte layer on the surface of the electrode film, the second electrolyte dry mixture comprising the dry electrolyte material.

9. The electrode of claim 8, wherein the second electrolyte dry mixture further comprises an electrolyte binder chosen from fibrillizable polymers, polytetrafluoroethylene, and poly(vinylidene fluoride), ultra-high molecular weight polypropylene, polyethylene, and copolymers or blends thereof.

10. The electrode of claim 1, wherein:

the active material comprises lithium cobalt oxide or nickel manganese cobalt;

the dry electrolyte material comprises $Li_3PS_4$ glass ceramic; and the binder comprises a fibrillizable polymer binder chosen from polytetrafluoroethylene, and poly(vinylidene fluoride), ultra-high molecular weight polypropylene, ultra-high molecular weight polyethylene, and copolymers or blends thereof.

11. The electrode of claim 1, wherein the electrode further comprises a stand-alone solid-state electrolyte film laminated against a surface of the electrode film;

wherein the stand-alone solid state electrolyte film comprises the dry electrolyte material.

12. The electrode of claim 1, wherein said binder is present at 10 percent by weight or less of the total of said electrode dry mixture, said dry electrolyte material, and said binder combined.

13. An electrochemical cell comprising the electrode of claim 1.

14. The electrochemical cell of claim 13 wherein the dry electrolyte material comprises a lithium phosphorus sulfide glass ceramic.

15. The electrochemical cell of claim 13 comprising an anode layer, wherein the anode layer is a Li foil protected on at least one surface with an anode protective layer, the anode protective layer comprising LiPON.

* * * * *